(12) United States Patent
Matsuda et al.

(10) Patent No.: US 7,634,118 B2
(45) Date of Patent: Dec. 15, 2009

(54) BIOMETRIC INFORMATION REGISTRATION APPARATUS, BIOMETRIC INFORMATION VERIFICATION APPARATUS, BIOMETRIC INFORMATION REGISTRATION/VERIFICATION SYSTEM, AND BIOMETRIC INFORMATION REGISTRATION PROGRAM

(75) Inventors: Takahiro Matsuda, Kawasaki (JP); Shoji Suzuki, Kawasaki (JP); Takashi Shinzaki, Kawasaki (JP); Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/453,694

(22) Filed: May 19, 2009

(65) Prior Publication Data

US 2009/0226053 A1  Sep. 10, 2009

Related U.S. Application Data

(63) Continuation of application No. 11/082,936, filed on Mar. 18, 2005, which is a continuation of application No. PCT/JP03/00774, filed on Jan. 28, 2003.

(51) Int. Cl.
*G06K 9/00* (2006.01)
(52) U.S. Cl. .................. 382/124; 382/115; 340/5.1; 340/5.8
(58) Field of Classification Search ............... 382/115, 382/116, 124
See application file for complete search history.

(56) References Cited

U.S. PATENT DOCUMENTS

| | | | |
|---|---|---|---|
| 5,224,173 A | 6/1993 | Kuhns et al. | |
| 5,420,937 A | 5/1995 | Davis | 382/125 |
| 6,070,159 A | 5/2000 | Wilson et al. | |
| 6,233,348 B1 | 5/2001 | Fujii et al. | 382/125 |
| 6,505,193 B1 | 1/2003 | Musgrave et al. | 707/3 |

(Continued)

FOREIGN PATENT DOCUMENTS

EP  0 780 781  6/1997

(Continued)

OTHER PUBLICATIONS

U.S. Appl. No. 11/082,936, filed Mar. 18, 2005, Takahiro Matsuda, et al., Fujitsu Limited.

(Continued)

*Primary Examiner*—Yosef Kassa
(74) *Attorney, Agent, or Firm*—Staas & Halsey LLP

(57) ABSTRACT

In relation to a system which effects one-to-many authentication using biometric information; e.g., a fingerprint, an iris, voice, a facial image, a vascular pattern, a dynamic signature, or a keystroke, in order to significantly shorten the time required to verify registered feature information against input feature information, there is performed extraction of verification-purpose feature information and a plurality of types of verification-purpose attribute information from the biometric information about an object of authentication; computation of verification priority levels of a plurality of registration-purpose feature information items on the basis of registration-purpose attribute information and the verification-purpose attribute information, both being associated with the registration-purpose feature information items; and sequential verification of the verification-purpose feature information against registration-purpose feature information in accordance with a computed verification priority level, thereby specifying registration-purpose feature information matching said verification-purpose feature information from said plurality of registration-purpose feature information items.

17 Claims, 14 Drawing Sheets

U.S. PATENT DOCUMENTS

| | | | |
|---|---|---|---|
| 6,839,453 B1 * | 1/2005 | McWilliam et al. | 382/119 |
| 7,006,673 B2 * | 2/2006 | Hamid | 382/124 |
| 7,027,623 B2 * | 4/2006 | McWilliam et al. | 382/119 |
| 7,233,686 B2 * | 6/2007 | Hamid | 382/124 |
| 7,274,807 B2 | 9/2007 | Hillhouse et al. | 382/124 |
| 2002/0048390 A1 | 4/2002 | Ikegami | 382/124 |

FOREIGN PATENT DOCUMENTS

| | | |
|---|---|---|
| JP | 11-195119 | 7/1999 |
| JP | 2000-148985 | 5/2000 |
| JP | 2002-133416 | 5/2002 |
| JP | 2002-163655 | 6/2002 |

OTHER PUBLICATIONS

Supplementary European Search Report issued in corresponding European Patent Application No. 03815576.8, on Aug. 6, 2007.

* cited by examiner

FIG. 5

| ID | REGISTERED FINGERPRINT DATA | ATTRIBUTE INFORMATION a | ATTRIBUTE INFORMATION b | ATTRIBUTE INFORMATION c |
|---|---|---|---|---|
| ID1 | FINGERPRINT DATA 1 | ATTRIBUTE a1 | ATTRIBUTE b1 | ATTRIBUTE c1 |
| ID2 | FINGERPRINT DATA 2 | ATTRIBUTE a2 | ATTRIBUTE b2 | ATTRIBUTE c2 |
| ID3 | FINGERPRINT DATA 3 | ATTRIBUTE a3 | ATTRIBUTE b3 | ATTRIBUTE c3 |
| .... | .... | .... | .... | .... |

RIGHT CENTRAL POCKET LOOP

LEFT CENTRAL POCKET LOOP

DOUBLE LOOP

PLAIN ARCH

PLAIN WHORL

LEFT LOOP

RIGHT LOOP

TENTED ARCH

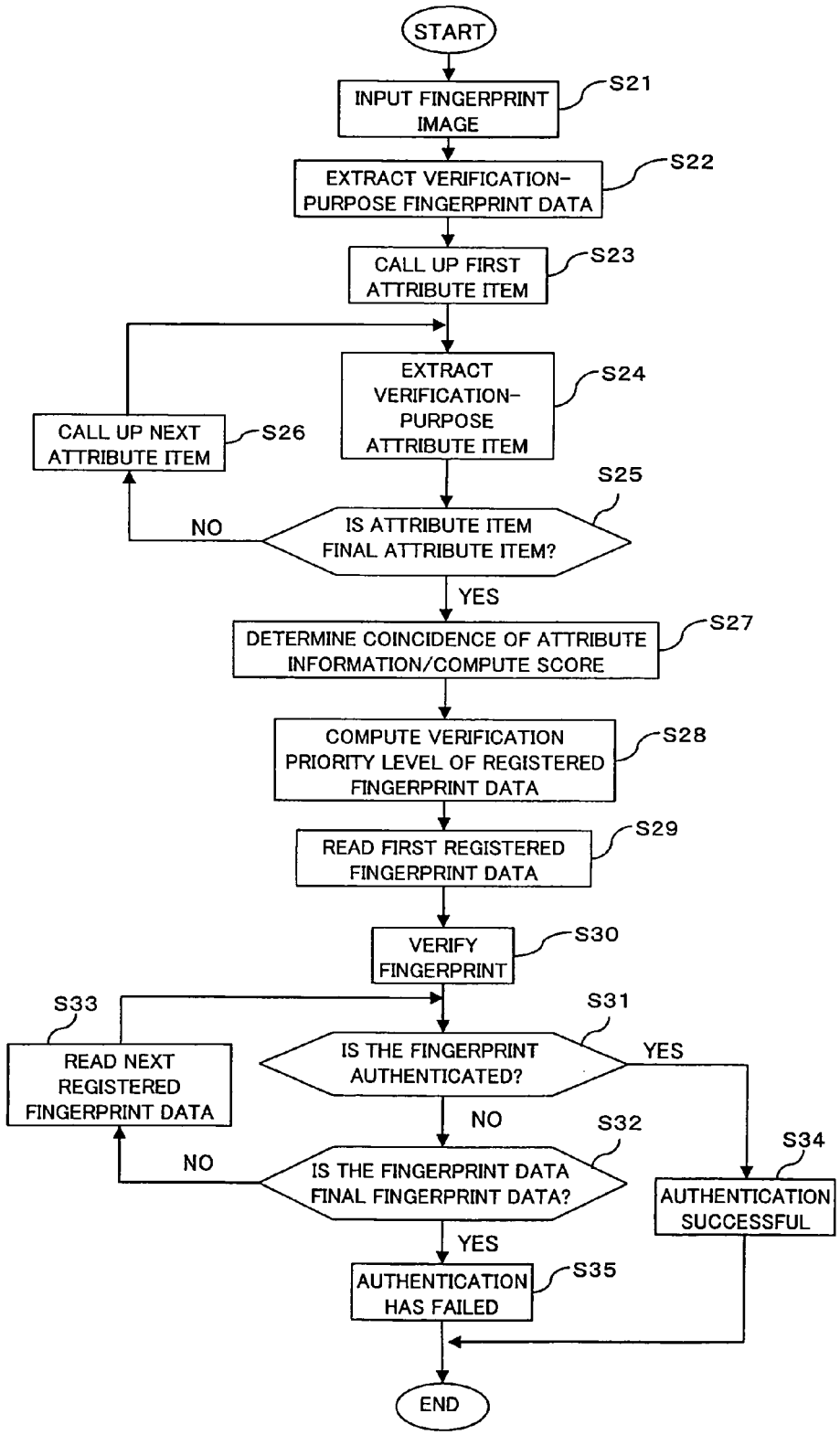

FIG. 13

|  |  | WEIGHTING COEFFICIENT | | |
|---|---|---|---|---|
|  |  | 3 | 2 | 1 |
| ID1 | FINGERPRINT DATA 1 | ATTRIBUTE a1 | ATTRIBUTE b1 | ATTRIBUTE c1 |
| ID2 | FINGERPRINT DATA 2 | ATTRIBUTE a2 | ATTRIBUTE b2 | ATTRIBUTE c2 |
| ID3 | FINGERPRINT DATA 3 | ATTRIBUTE a3 | ATTRIBUTE b3 | ATTRIBUTE c3 |

FIG. 14

|  |  |  |  |  | SCORE |
|---|---|---|---|---|---|
| ID2 | FINGERPRINT DATA 2 | <u>ATTRIBUTE a2</u> | <u>ATTRIBUTE b2</u> | <u>ATTRIBUTE c2</u> | 6 |
| ID1 | FINGERPRINT DATA 1 | <u>ATTRIBUTE a1</u> | ATTRIBUTE b1 | <u>ATTRIBUTE c1</u> | 4 |
| ID3 | FINGERPRINT DATA 3 | ATTRIBUTE a3 | <u>ATTRIBUTE b3</u> | ATTRIBUTE c3 | 2 |

|  |  | PRIORITY LEVEL | | |
|---|---|---|---|---|
|  |  | 2 | 1 | 3 |
| ID2 | FINGERPRINT DATA 2 | ATTRIBUTE a2 | ATTRIBUTE b2 | ATTRIBUTE c2 |
| ID3 | FINGERPRINT DATA 3 | ATTRIBUTE a3 | ATTRIBUTE b3 | ATTRIBUTE c3 |
| ID1 | FINGERPRINT DATA 1 | ATTRIBUTE a1 | ATTRIBUTE b1 | ATTRIBUTE c1 |

FIG. 18

| RANK | ATTRIBUTE INFORMATION b | ATTRIBUTE INFORMATION a | ATTRIBUTE INFORMATION c |
|---|---|---|---|
| TOP-RANKED GROUP | MATCH | MATCH | MATCH |
| SECOND-RANKED GROUP | MATCH | MATCH | MISMATCH |
| THIRD-RANKED GROUP | MATCH | MISMATCH | MATCH |
| FOURTH-RANKED GROUP | MATCH | MISMATCH | MISMATCH |
| FIFTH-RANKED GROUP | MISMATCH | MATCH | MATCH |
| SIXTH-RANKED GROUP | MISMATCH | MATCH | MISMATCH |
| SEVENTH-RANKED GROUP | MISMATCH | MISMATCH | MATCH |
| EIGHTH-RANKED GROUP | MISMATCH | MISMATCH | MISMATCH |

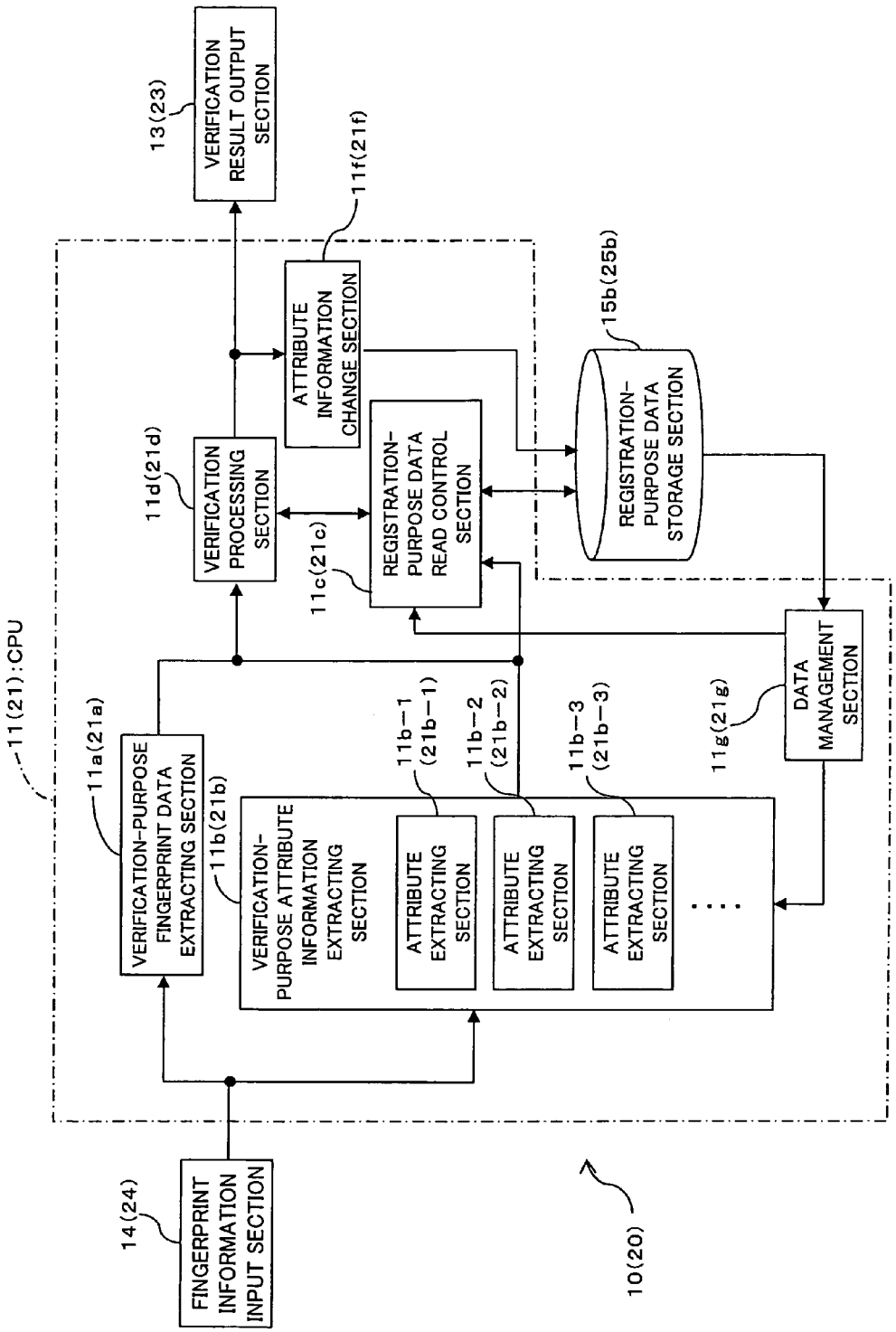

BIOMETRIC INFORMATION REGISTRATION APPARATUS, BIOMETRIC INFORMATION VERIFICATION APPARATUS, BIOMETRIC INFORMATION REGISTRATION/VERIFICATION SYSTEM, AND BIOMETRIC INFORMATION REGISTRATION PROGRAM

CROSS-REFERENCE TO RELATED APPLICATIONS

This application is a continuation of U.S. patent application Ser. No. 11/082,936, filed Mar. 18, 2005, now allowed, which is a continuation application, under 35 USC 111(a), of International Application PCT/JP2003/000774, filed Jan. 28, 2003, the contents of which are incorporated herein by reference.

BACKGROUND OF THE INVENTION

1. Field of the Invention

The present invention relates to a technique suitable for use in a system which authenticates the identity of a person by means of biometric information (biometrics information); for example, a fingerprint, a palm pattern, an iris (iris muscle pattern), a voice, a facial image, a vascular pattern (a retinal vascular pattern, or a vein pattern), a dynamic signature, or a keystroke.

2. Description of the Related Art

Recently, in association with extensive introduction of a computer into society, attention has been focused on security. An ID card or a password has hitherto been used as identification means when a person enters a computer room or makes use of a terminal. However, these means have many security problems.

For this reason, biometrics authentication utilizing biometric information about a human has recently been put into widespread use as identification means which is more reliable than the ID card or the password. For instance, a fingerprint, a palm pattern, an iris, a facial image, a voice, a vascular pattern, a dynamic signature, or a keystroke is used as biometric information. Commercialization of a biometric authentication technique utilizing a fingerprint among these pieces of biometric information has been pursued most extensively.

One-to-one authentication is usually used for fingerprint authentication. Specifically, a subject of authentication enters an ID, such as a user name, and a fingerprint as well. Registered fingerprint data, which have been registered beforehand, are read in association with the ID, and personal authentication is performed by verifying the registered fingerprint data against the fingerprint data input by the subject of authentication. However, such one-to-one authentication requires a keyboard and a keypad used for inputting an ID, as well as a fingerprint sensor, thus requiring equipment cost. Further, there also exists strong demand for reducing the effort required when the subject of authentication inputs an ID.

In contrast, an authentication technique for specifying a person by inputting only a fingerprint without inputting an ID is called one-to-many authentication. According to this one-to-many authentication, the fingerprint data input by the subject of authentication are verified against all of the fingerprint data sets that have been registered in advance to thus specify fingerprint data coinciding with the input fingerprint data from among the registered fingerprint data, thereby authenticating the subject. However, according to such one-to-many authentication, an increase in the number of registered fingerprint data sets naturally entails an increase in the time required to verify all the registered fingerprint data against input fingerprint data. For this reason, shortening of the verification time is desired.

A technique for minimizing an increase in the verification time required for one-to-many authentication is described in, e.g., Japanese Patent Laid-Open NO. 2002-133416 (hereinafter called Patent Document 1). According to the technique disclosed in Patent Document 1, attribute information (e.g., a fingerprint pattern type: see FIG. 6A to FIG. 6H) other than fingerprint data used for verification is detected. The registered fingerprint data have been classified in advance by means of the attribute information. Input fingerprint data are verified against registered fingerprint data that have the same attribute information (a pattern type) as that obtained from the subject of authentication during authenticating operation. However, when, for instance, a fingerprint pattern type is used as attribute information, the registered fingerprint data can be classified only into the number "n" of fingerprint-type groups (e.g., eight types shown in FIGS. 6A to 6H) by means of such a technique. Therefore, the shortening of verification time is limited to a factor of only to about one-$n^{th}$.

The present invention has been conceived in view of this problem and realizes significant shortening of the time required to verify input feature information against registered feature information when one-to-many authentication is performed through use of biometric information.

SUMMARY OF THE INVENTION

To achieve the object, a biometric information registration apparatus of the present invention is characterized by comprising: a registration-purpose biometric information input section which samples, from a registered subject, registration-purpose biometric information to be used for one-to-many authentication and inputs the sampled information; a registration-purpose feature information extracting section which extracts registration-purpose feature information from the registration-purpose biometric information input by the registration-purpose biometric information input section; a registration-purpose attribute information extracting section which extracts, from the registration-purpose biometric information input by the registration-purpose biometric information input section, a plurality of types of registration-purpose attribute information differing from the registration-purpose feature information; and a registration section for registering, in an associated manner, the registration-purpose feature information extracted by the registration-purpose feature information extracting section and the plurality of types of registration-purpose attribute information extracted by the registration-purpose attribute information extracting section.

A biometric information verification apparatus of the present invention is also characterized by comprising: a verification-purpose biometric information input section which samples, from a subject of authentication, verification-purpose biometric information to be used for one-to-many authentication and which inputs the sampled information; a verification-purpose feature information extracting section which extracts verification-purpose feature information from the verification-purpose biometric information input by the verification-purpose biometric information input section; a verification-purpose attribute information extracting section which extracts, from the verification-purpose biometric information input by the verification-purpose biometric information input section, a plurality of types of verification-purpose information differing from the verification-purpose feature information; a verification priority level computation section which computes priority levels of a plurality of registration-purpose feature information items to be verified against the verification-purpose feature information extracted by the verification-purpose feature information extracting section, on the basis of a plurality of types of registration-purpose attribute information associated with the plurality of registration-purpose feature information and the plurality of types of verification-purpose attribute information extracted by the verification-purpose attribute information extracting section; and a verification section which sequentially verifies the verification-purpose feature information extracted by the verification-purpose feature information extracting section against the plurality of registration-purpose feature information in accordance with the verification priority level computed by the verification-priority computation section, to thus specify information, which coincides with the verification-purpose feature information, from among the plurality of registration-purpose feature information items.

Further, a biometric information registration/verification system of the present invention is characterized by comprising a registration-purpose biometric information input section which samples, from a registered subject, registration-purpose biometric information to be used for one-to-many authentication and inputs the sampled information; a registration-purpose feature information extracting section which extracts registration-purpose feature information from the registration-purpose biometric information input by the registration-purpose biometric information input section; a registration-purpose attribute information extracting section which extracts, from the registration-purpose biometric information input by the registration-purpose biometric information input section, a plurality of types of registration-purpose attribute information differing from the registration-purpose feature information; a registration section for registering, in an associated manner, the registration-purpose feature information extracted by the registration-purpose feature information extracting section and the plurality of types of registration-purpose attribute information extracted by the registration-purpose attribute information extracting section; a registration-purpose data storage section for storing the registration-purpose feature information and the plurality of types of registration-purpose attribute information, which are registered in an associated manner by the registration section; a verification-purpose biometric information input section which samples, from a subject of authentication, verification-purpose biometric information to be used for one-to-many authentication and which inputs the sampled information; a verification-purpose feature information extracting section which extracts verification-purpose feature information from the verification-purpose biometric information input by the verification-purpose biometric information input section; a verification-purpose attribute information extracting section which extracts, from the verification-purpose biometric information input by the verification-purpose biometric information input section, a plurality of types of verification-purpose information differing from the verification-purpose feature information; a verification priority level computation section which computes priority levels of the registration-purpose feature information items which are stored by the registration-purpose data storage section to be verified against the verification-purpose feature information extracted by the verification-purpose feature information extracting section, on the basis of the plurality of types of registration-purpose attribute information associated with the plurality of registration-purpose feature information and the plurality of verification-purpose attribute information extracted by the verification-purpose attribute information extracting section; and a verification section which sequentially verifies the verification-purpose feature information extracted by the verification-purpose feature information extracting section against the plurality of registration-purpose feature information in accordance with the verification priority level computed by the verification-priority computation section, to thus specify information, which coincides with the verification-purpose feature information, from among the plurality of registration-purpose feature information items.

A biometric information registration program of the present invention is for registering, into a registration-purpose data storage section, registration-purpose biometric information sampled from a subject of registration used for one-to-many authentication, the program being characterized to cause a computer to act as a registration-purpose feature information extracting section; a registration-purpose attribute information extracting section; and a registration section.

According to the biometric information registration apparatus, the biometric information verification apparatus, the biometric information registration/verification system, and the biometric information registration program, all pertaining to the present invention, when one-to-many authentication is performed through use of biometric information, the verification priority levels of a plurality of registration-purpose feature information items are computed on the basis of the plurality of types of registration-purpose attribute information items associated with the registration-purpose feature information items and the plurality of types of verification-purpose attribute information items extracted from the biometric information about the subject of authentication. The verification-purpose feature information extracted from the biometric information about the subject of authentication is sequentially verified against the registration-purpose feature information items in accordance with the computed verification priority levels, whereupon the registration-purpose feature information coinciding with the verification-purpose feature information is specified among the plurality of registration-purpose feature information items.

As mentioned above, the higher the verification priority level of the registration-purpose feature information determined on the basis of a plurality of types of attribute information, the higher the probability of matching feature information about the subject of authentication. Accordingly, verification-purpose feature information is verified in accordance with a verification priority level without being verified against all of pieces of the registration-purpose feature information when one-to-many verification is conducted. If a certain degree of coincidence is acquired, registration-purpose feature information about the subject of verification can be determined. The time required for verification (the number of times verification is performed) can be significantly curtailed, and an attempt can also be made to enhance the precision of verification.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a view for describing data contents in a registration-purpose data storage section of the embodiment;

FIG. 12 is a flowchart for describing fingerprint data verification procedures (operation of a fingerprint data verification apparatus) of the embodiment;

FIGS. 13 and 14 are views for describing verification priority level computation procedures of the present embodiment;

FIG. 16 is a flowchart for describing a modification of verification priority level computation procedures according to the present embodiment;

FIGS. 17 and 18 are views for describing a modification of verification priority level computation procedures of the present embodiment; and FIG. 19 is a block diagram showing the functional configuration of a modification of the fingerprint data verification apparatus (biometric information verification apparatus) according to the embodiment.

DETAILED DESCRIPTION OF THE PREFERRED EMBODIMENTS

Best Modes for Implementing the Invention

Embodiments of the present invention will be described hereinbelow by reference to the drawings.

[1] Hardware Configuration

Figure 3:
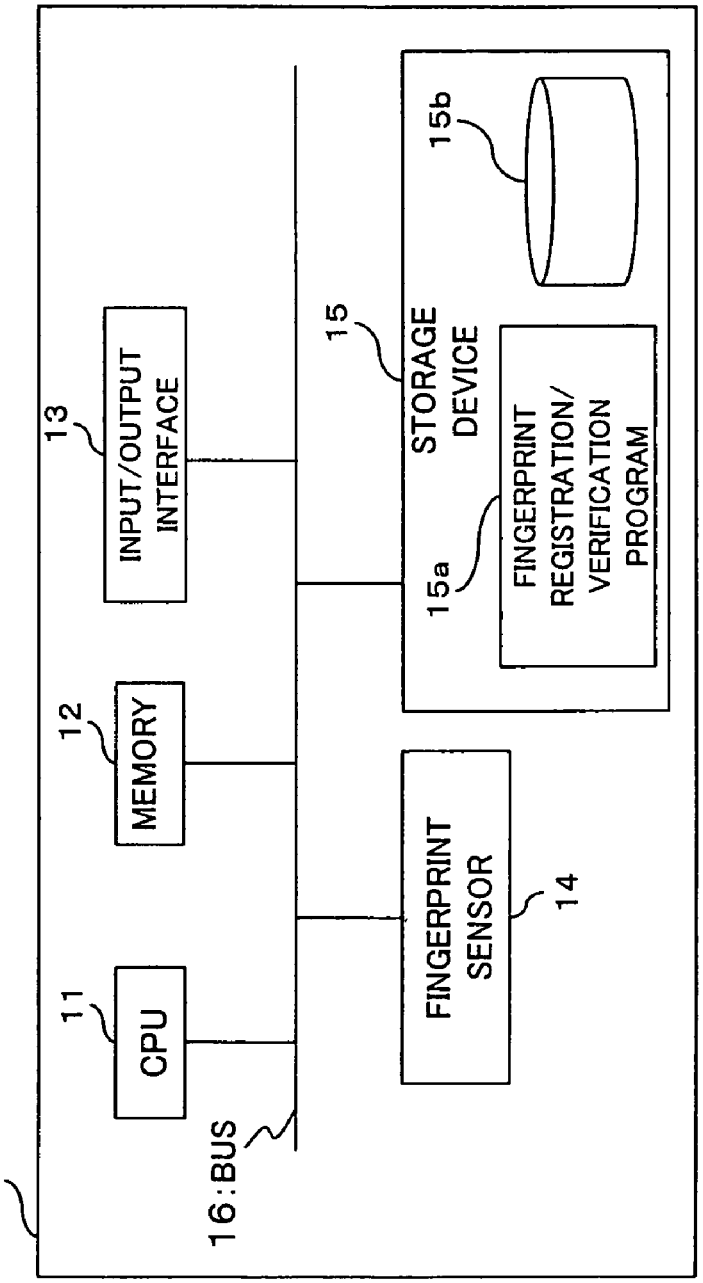
FIG. 3 is a block diagram showing the hardware configuration of a fingerprint authentication apparatus (a biometric information registration/verification apparatus) according to the embodiment.
Figure 4:
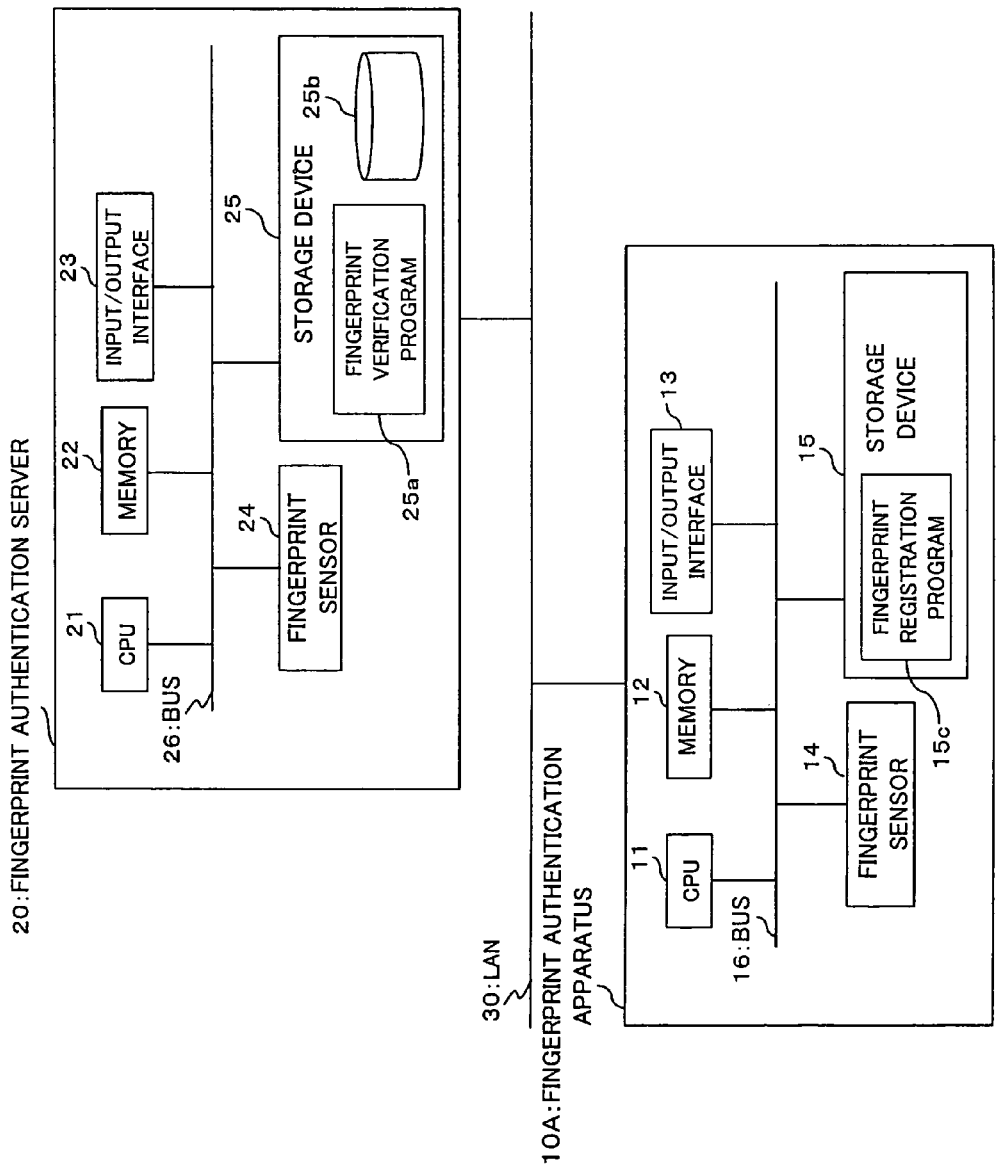
FIG. 4 is a block diagram showing the hardware configuration of a fingerprint authentication system (a biometric information registration/verification system) according to the embodiment.
Figure 6A:
FIGS. 6A to 6H are views showing specific examples of fingerprints for describing pattern types of fingerprints which serve as attribute information in the embodiment.
Figure 6B:
Figure 6C:
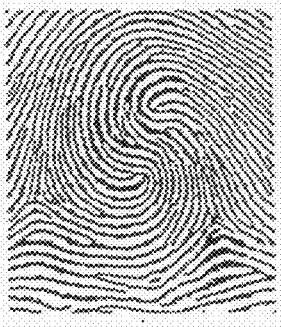
Figure 6D:
Figure 6E:
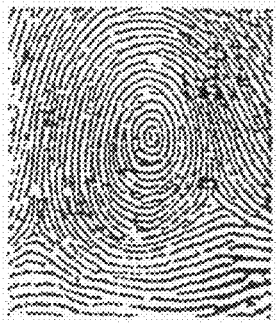
Figure 6F:
Figure 6G:
Figure 6H:

The present invention is embodied as a fingerprint authentication apparatus (a biometric information registration/verification apparatus) 10 such as that shown in FIG. 3, or a fingerprint authentication system (a biometric information registration/verification system) such as that shown in FIG. 4. FIGS. 3 and 4 are block diagrams showing the hardware configuration of the fingerprint authentication apparatus and that of the fingerprint authentication system, respectively.

The fingerprint authentication apparatus 10 shown in FIG. 3 is configured as having the function of a fingerprint data registration apparatus (a biometric information registration apparatus) to be described later by reference to FIG. 1 and the function of a fingerprint data verification apparatus (a biometric information verification apparatus) to be described later by reference to FIG. 2. The fingerprint authentication apparatus 10 is configured by connecting a fingerprint sensor 14 to a personal computer. This personal computer is a general computer configured by mutually connecting at least a CPU 11, memory (ROM, RAM) 12, an input/output interface 13, and a storage device (a hard disk drive or the like) 15 by means of a bus 16. The fingerprint sensor 14 is also connected to the CPU 11 by way of the bus 16.

Here, any type of fingerprint sensor, such as an electrostatic capacitive fingerprint sensor, an optical fingerprint sensor, or a heat sensitive fingerprint sensor, may be used as the fingerprint sensor 14.

A fingerprint registration/verification program (a biometric information registration/verification program) 15a is stored in the storage device 15 of the fingerprint authentication apparatus 10. As will be described later by reference to FIG. 5, the storage device 15 performs the function of a registration-purpose data storage section 15b which stores registered fingerprint data (registration-purpose feature information) extracted from a fingerprint registrant and registration-purpose attribute information in association with an ID of the fingerprint registrant.

By means of reading and executing the fingerprint registration/verification program 15a stored in the storage device 15, the CPU 11 of the fingerprint authentication apparatus 10 fulfills the function of a fingerprint data registration apparatus (a biometric information registration apparatus) to be described later by reference to FIG. 1 and a fingerprint data verification apparatus (a biometric information verification apparatus) to be described later by reference to FIG. 2.

By means of the foregoing configuration, the fingerprint authentication apparatus 10 shown in FIG. 3 performs registration operation (which will be described in detail later) for registering and storing the registration-purpose data extracted from the subject of registration using the fingerprint sensor 14 into the storage device 15 (the registration-purpose data storage section 15b). Further, the fingerprint authentication apparatus 10 performs verification processing (personal authentication which will be described in detail later) on the basis of the verification-purpose data extracted from the subject of authentication using the fingerprint sensor 14 and registration-purpose data stored in the storage device 15 (the registration-purpose data storage section 15b).

The fingerprint authentication system (a biometric information registration/verification system) shown in FIG. 4 comprises a fingerprint authentication apparatus 10A which performs the function of a fingerprint data registration apparatus (a biometric information registration apparatus) to be described later by reference to FIG. 1; a fingerprint authentication server 20 which performs the function of a fingerprint data verification apparatus (a biometric information verification apparatus) to be described later by reference to FIG. 2; and a LAN (Local Area Network) 30 which connects the fingerprint authentication apparatus 10A to the fingerprint authentication server 20 in a communicable manner.

In this fingerprint authentication system, the fingerprint authentication apparatus 10A is configured by connecting the fingerprint sensor 14, such as an electrostatic fingerprint sensor, an optical fingerprint sensor, or a heat-sensitive fingerprint sensor, to a common personal computer which is built by connecting at least the CPU 11, the memory (ROM, RAM) 12, the input/output interface 13, and the storage device (a hard disk drive or the like) 15 by means of the bus 16, as is the fingerprint authentication apparatus 10 shown in FIG. 3.

A fingerprint registration program (a biometric information registration program) 15c is stored in the storage device 15 of the fingerprint authentication apparatus 10A. The CPU 11 of the fingerprint authentication apparatus 10A fulfills the function of a fingerprint data registration apparatus (a biometric information registration apparatus) to be described later by reference to FIG. 1, by means of reading and executing the fingerprint registration program 15c.

The fingerprint authentication server 20 is configured by connecting a fingerprint sensor 24, such as an electrostatic capacitive fingerprint sensor, an optical fingerprint sensor, or a heat-sensitive fingerprint sensor, to a common server (a personal computer) which is built by mutually connecting at least a CPU 21, memory (ROM, RAM) 22, an input/output interface 23, and a storage device (a hard disk drive or the like) 25 by means of a bus 26.

A fingerprint verification program (a biometric information verification program) 25a is stored in the storage device 25 of the fingerprint verification server 20. Like the storage device 15 shown in FIG. 3, as will be described later by reference to FIG. 5, the storage device 25 performs the function of a registration-purpose data storage section 25b which stores registered fingerprint data (registration-purpose feature information) extracted from the fingerprint registrant and registration-purpose attribute information in association with the ID of the fingerprint registrant.

By means of reading and executing the fingerprint registration/verification program 25a stored in the storage device 25, the CPU 21 of the fingerprint authentication apparatus 20 fulfills the function of a fingerprint data verification apparatus (a biometric information verification apparatus) to be described later by reference to FIG. 2.

By means of the foregoing configuration, the fingerprint authentication apparatus 10A shown in FIG. 4 performs registration operation (which will be described in detail later) for registering and storing the registration-purpose data extracted from the subject of registration using the fingerprint sensor 14 into the storage device 25 (the registration-purpose data storage section 25b) of the fingerprint authentication server 20 by way of the LAN 30.

Further, when personal authentication is performed, the subject of authentication inputs a fingerprint image by use of the fingerprint sensor 14 connected to the fingerprint authentication apparatus 10A or the fingerprint sensor 24 connected to the fingerprint authentication server 20 and sends the fingerprint image to the fingerprint authentication server 20. The fingerprint authentication server 20 performs verification processing (which will be described in detail later) for verifying the verification-purpose data extracted from the fingerprint image of the subject of authentication against the data registered in the storage device 25 (the registration-purpose data storage section 25b).

[2] Functional Configuration

The functional configuration of a fingerprint data registration apparatus (a biometric information registration apparatus) of the present embodiment and that of the fingerprint data verification apparatus (a biometric information verification apparatus), which are implemented by the hardware configuration shown in FIGS. 3 and 4, will be described by reference to the block diagrams shown in FIGS. 1 and 2. Unparenthesized reference numerals in FIGS. 1 and 2 and the following descriptions are assigned to the functional configurations realized by the hardware configuration (the fingerprint authentication apparatus 10) shown in FIG. 3. Parenthesized reference numerals are assigned to the functional configuration realized by the hardware configuration (a fingerprint authentication system) shown in FIG. 4. When unparenthesized reference numerals and parenthesized reference numerals are identical with each other, in some cases inscription of the parenthesized reference numerals is omitted.

[2-1] Functional Configuration of the Fingerprint Data Registration Apparatus

Figure 1:
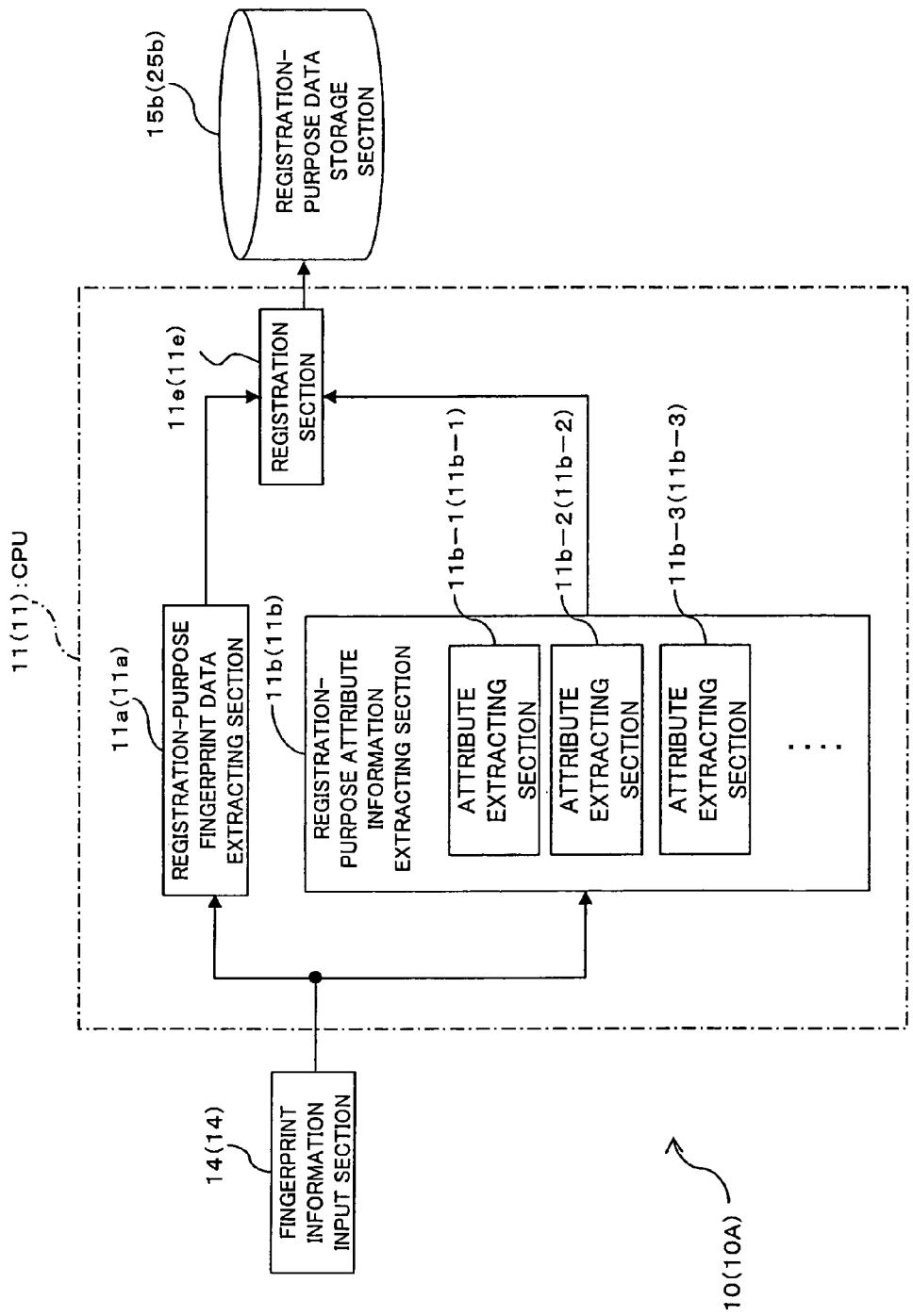
FIG. 1 is a block diagram showing a functional configuration of a fingerprint data registration apparatus (a biometric information registration apparatus) serving as an embodiment of the present invention.

The fingerprint data registration apparatus of the present embodiment shown in FIG. 1 is configured from the fingerprint sensor 14 (14), a registration-purpose fingerprint data extracting section 11a (11a), a registration-purpose attribute information extracting section 11b (11b); a registration section 11e (11e); and a registration-purpose data storage section 15b (25b). The function of the registration-purpose fingerprint data extracting section 11a (11a), that of the registration-purpose attribute information extracting section 11b (11b), and that of the registration section 11e (11e) can be implemented by means of the CPU 11 executing the fingerprint registration/verification program 15a (the fingerprint registration program 15c).

As mentioned previously, the fingerprint sensor 14 is an electrostatic capacitive fingerprint sensor, an optical fingerprint sensor, or a heat-sensitive fingerprint sensor and functions as a registration-purpose biometric information input section (a fingerprint information input section) which samples from a subject of registration a registration-purpose fingerprint image as registration-purpose biometric information to be used for one-to-many authentication and inputs the sampled image to the CPU 11.

The registration-purpose fingerprint data extracting section (the registration-purpose feature information extracting section) 11a is for extracting information about feature points (minutiae) of ridges in a fingerprint image from a registration-purpose fingerprint image input by way of the fingerprint sensor 14 as the registered fingerprint data (registration-purpose feature information) through use of the Minutia method disclosed in, e.g., Japanese Patent Laid-Open NO. HEI 11-195119. Specifically, the information about feature points includes the positions, types (end points and bifurcation points), directions of the feature points, and positions of feature points projected as a result of the feature points being projected on the ridges.

The registration-purpose attribute information extracting section 11b extracts, from the registration-purpose fingerprint image input by way of the fingerprint sensor 14, a plurality of types of registration-purpose attribute information items which are different from the registered fingerprint data extracted by the registration-purpose fingerprint data extracting section 11a. The registration-purpose attribute information extracting section 11b has attribute information extracting sections 11b-1, 11b-2, 11b-3, . . . which extract attribute information for each type of registration-purpose attribute information to be extracted.

From the following items (1) to (7), two or more are extracted as registration-purpose attribute information:

(1) The pattern type of a fingerprint in a registration-purpose fingerprint image;

(2) The geometry of a finger in the registration-purpose fingerprint image;

(3) The number of feature points extracted from the registration-purpose fingerprint image;

(4) The volume of registered fingerprint data (registration-purpose feature information) extracted from the registration-purpose fingerprint image;

(5) A processing time (computing time) required to extract the registered fingerprint data by means of the registration-purpose fingerprint data extracting section 11a;

(6) The moisture content of the finger surface in the registration-purpose fingerprint image; and (7) The input environment information about the registration-purpose fingerprint image.

Here, the pattern types of fingerprints in the registration-purpose finger print images (1) are eight types (i.e., a right central pocket loop, a left central pocket loop, a double loop, a plain arch, a plain whorl, a left loop, a right loop, and a tented arch) such as those shown in, e.g., FIGS. 6A to 6H. A technique for extracting these pattern types is disclosed in, e.g., Japanese Patent Laid-Open NO. 2002-133416. FIGS. 6A to 6H are views showing specific fingerprint examples for describing pattern types of fingerprints as attribute information of the present embodiment.

Figure 7:
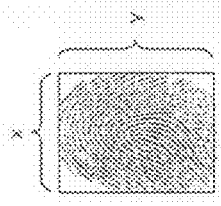
FIG. 7 is a view for describing the geometry of a finger which serves as attribute information of the embodiment.

The geometry of the finger (2) is defined as shown in, e.g., FIG. 7. Specifically, as shown in FIG. 7, the geometry of the finger remaining in touch with a sensor face of the fingerprint sensor 14 is defined and extracted as a rectangle which has a lateral length "X" and a longitudinal length "y" and circumscribes the fingerprint image. FIG. 7 is a view for describing the geometry of a finger as attribute information in the embodiment.

The number of feature points (3) is acquired by measuring the feature points extracted from the registered fingerprint image by the registration-purpose fingerprint data extracting section 11a through use of the Minutia method.

Similarly, the volume of data (4) is obtained by measuring the registered fingerprint data extracted by the registration-purpose fingerprint data extracting section 11a through use of the Minutia method. The processing time (5) is acquired by counting the time required by the registration-purpose fingerprint data extracting section 11a to extract the registered fingerprint data through use of the Minutia method.

Figure 8A:
FIGS. 8A, 9A, and 10A are views showing example fingerprint images of fingers having different (low, medium, and high, respectively) moisture contents.
Figure 8B:
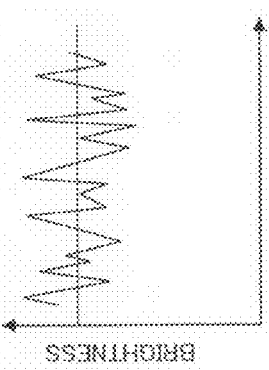
FIGS. 8B, 9B, and 10B are graphs showing brightness of the example fingerprint images in FIGS. 8A, 9A, and 10A, respectively.
Figure 9A:
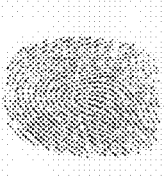
Figure 9B:
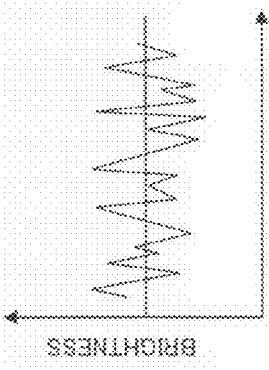
Figure 10A:
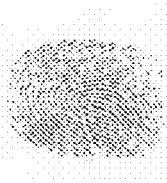
Figure 10B:
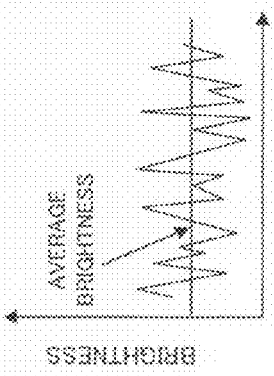

When the electrostatic capacitive fingerprint sensor is used as the fingerprint sensor 14, the brightness of an output image changes in accordance with the moisture content of the surface of the finger. Here, FIGS. 8A, 9A, and 10A are views showing fingerprint image examples of fingers having different moisture contents (low, medium, and high, respectively). FIGS. 8B, 9B, and 10B are graphs showing brightness of the fingerprint image examples shown in FIGS. 8A, 9A, and 10A, respectively. In the case of a finger having a low moisture content, a fingerprint image having a low brightness level, such as that shown in FIGS. 8A and 8B, is sampled. In contrast, in the case of a finger having a high moisture content, a fingerprint image having a high brightness level, such as those shown in FIGS. 10A and 10B, is sampled. In the case of a finger having a medium moisture content, a fingerprint image having an intermediate (standard) brightness level, such as those shown in FIGS. 9A and 9B, is sampled. When the fingerprint image is sampled by means of the electrostatic capacitive fingerprint sensor 14, the output gain of the fingerprint sensor 14 is generally compensated in accordance with the brightness level in order to acquire a bright fingerprint image (specifically, a fingerprint image having an intermediate brightness level such as that shown in FIGS. 9A and 9B). The amount of gain compensation computed during such a compensating operation corresponds to the moisture content of the finger surface. The moisture content of the finger surface (6) can be extracted as the amount of gain compensation.

In the fingerprint authentication system such as that shown in FIG. 4, when a user registers a finger in the fingerprint authentication server 20 over the Internet from a personal computer (corresponding to the fingerprint authentication apparatus 10A in FIG. 4) of the user, registration-purpose attribute information can be acquired from the input environment information about the registration-purpose fingerprint image (7). Specifically, the input environment information is the IP (Internet Protocol) address of the personal computer or the user name of a logged-in user.

The registration section 11e registers, in the registration-purpose data storage section 15b (25b), the registered fingerprint data extracted by the registration-purpose fingerprint data extracting section 11a and a plurality of types of registration-purpose attribute information extracted by the registration-purpose attribute information extracting section 11b in an associated manner. More specifically, as shown in FIG. 5, in the registration-purpose data storage section 15b (25b), the registered fingerprint data extracted from the registered fingerprint image of the fingerprint registrant and a plurality of types of the registration-purpose attribute information (three types in FIG. 5) are compiled into a database and then registered and stored in the form of a table in association with the ID of the fingerprint registrant.

Here, FIG. 5 is a view for describing data contents in the registration-purpose data storage section 15b (25b). In the embodiment shown in FIG. 5, the IDs (ID1, ID2, and ID3) of the respective fingerprint registrants are associated with the registered fingerprint data (fingerprint data 1, fingerprint data 2, and fingerprint data 3), and three types of attribute information "a" (e.g., a pattern type: attributes a1, a2, and a3), "b" (e.g., the number of feature points; attributes b1, b2, and b3), or "c" (e.g., moisture contents; attributes c1, c2, and c3).

In the fingerprint authentication apparatus 10 shown in FIG. 3, the registration section 11e registers registered fingerprint data and a plurality of types of registration-purpose attribute information into the storage device 15 (the registration-purpose data storage section 15b) built in the same personal computer. In the fingerprint authentication system shown in FIG. 4, the registration section 11e registers the registered fingerprint data and a plurality of types of registration-purpose attribute information in the fingerprint authentication server 20 and the storage device 25 (the registration-purpose data storage section 25b) by way of a communication line (LAN 30).

Figure 11:
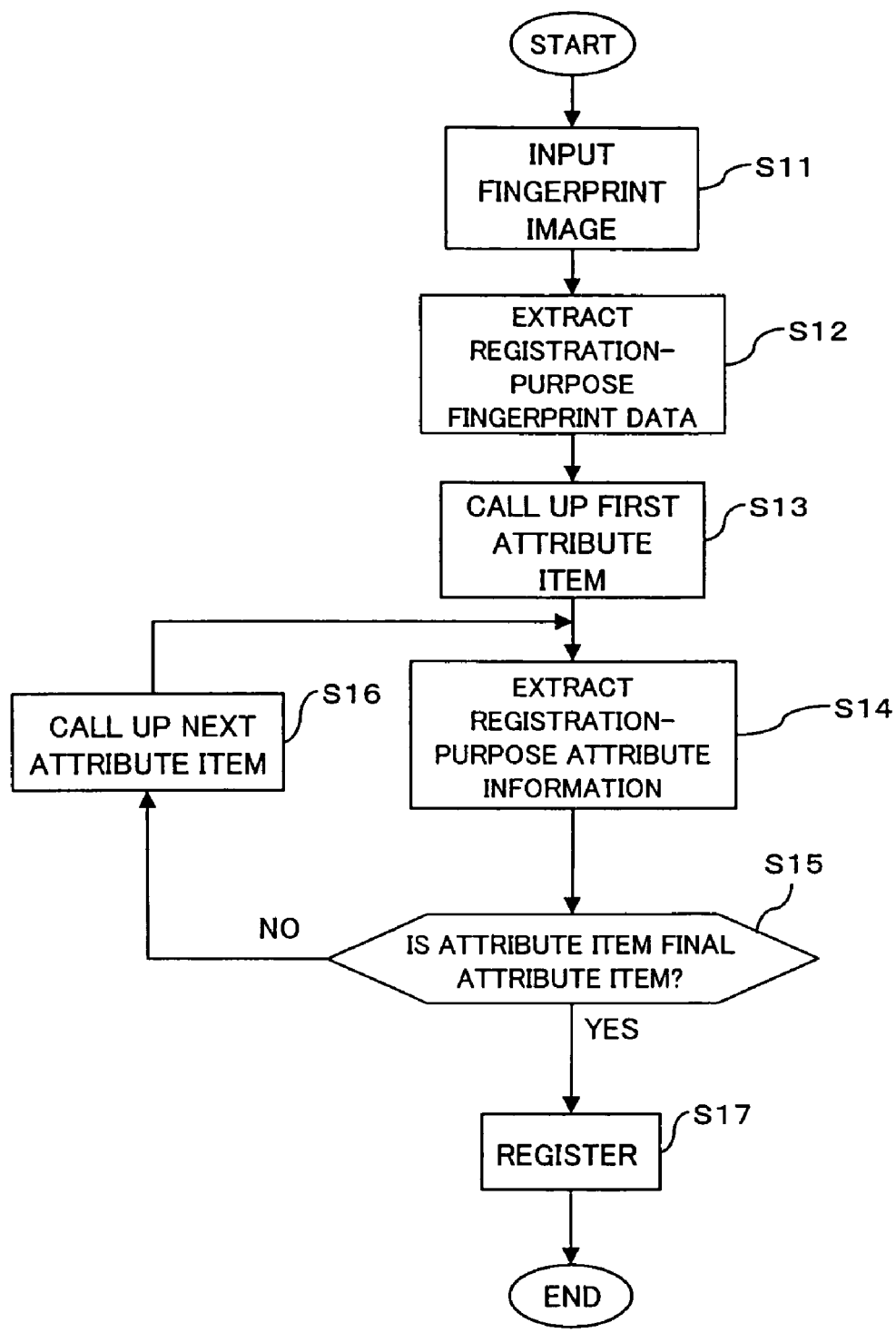
FIG. 11 is a flowchart for describing fingerprint data registration procedures (operation of a fingerprint data registration apparatus) of the embodiment.

Operation of the fingerprint data registration apparatus of the previously-described embodiment (fingerprint data registration procedures) will be described later by reference to FIG. 11.

[2-2] Functional Configuration of the Fingerprint Data Verification Apparatus

Figure 2:
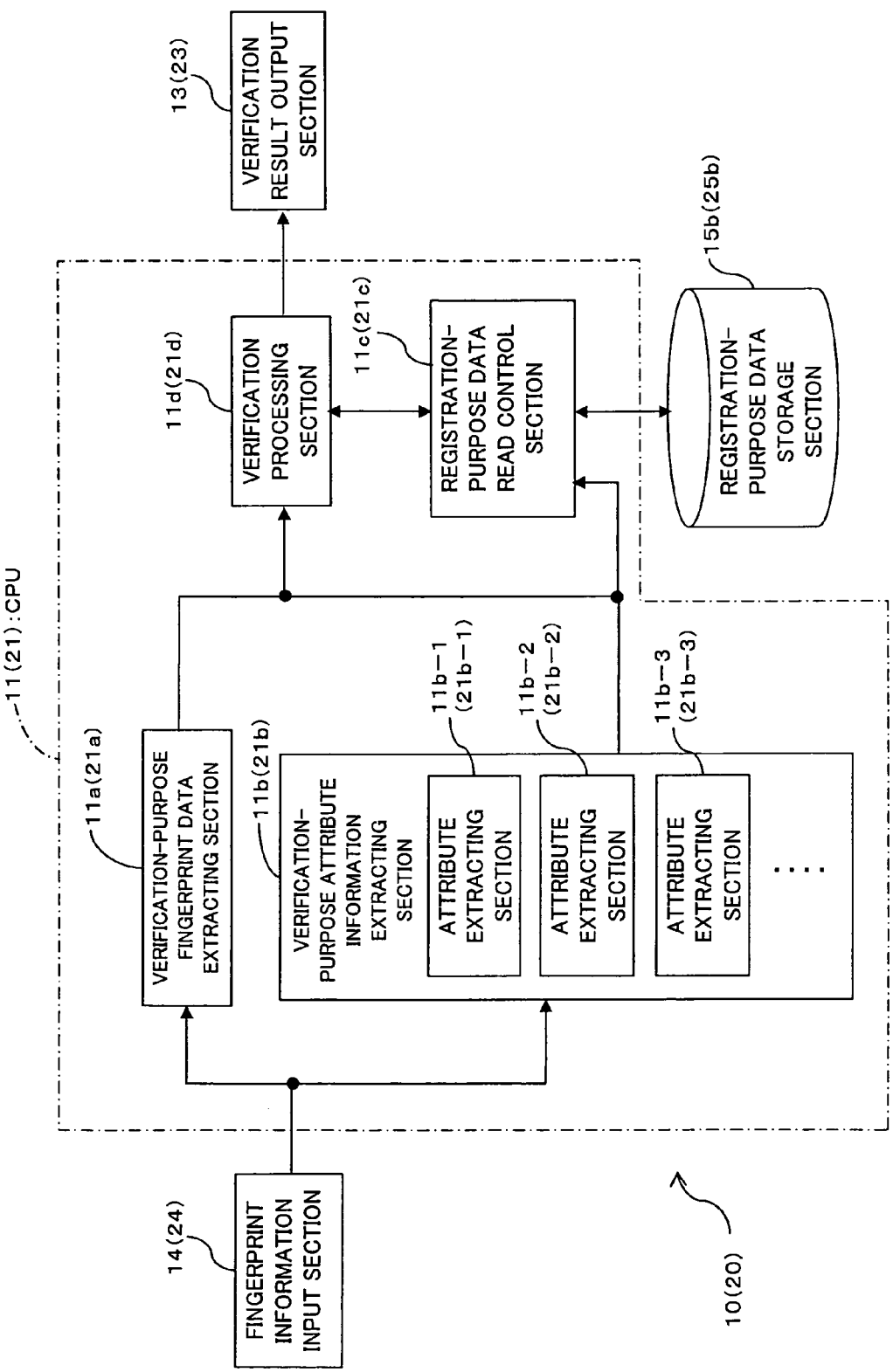
FIG. 2 is a block diagram showing a functional configuration of a fingerprint data verification apparatus (a biometric information verification apparatus) serving as the embodiment of the present invention.

The fingerprint data verification apparatus of the embodiment shown in FIG. 2 comprises the fingerprint sensor 14 (24); the verification-purpose fingerprint data extracting section 11a (21a); the verification-purpose attribute information extracting section 11b (21b); a registration-purpose data read control section 11c (21c); a verification section 11d (21d); a verification result output section 13 (23); and the registration-purpose data storage section 15b (25b). The function of the verification-purpose fingerprint data extracting section 11a (21a), that of the verification-purpose attribute information extracting section 11b (21b), that of the registration-purpose data read control section 11c (21c), and that of the verification section 11d (21d) are fulfilled by means of the CPU 11 (21) executing the fingerprint registration/verification program 15a (the fingerprint verification program 25a).

As mentioned previously, the fingerprint sensor 14 (24) is an electrostatic capacitive sensor, an optical sensor, or a heat-sensitive sensor, and functions as a verification-purpose biometric information input section (a fingerprint information input section) which samples, from a subject of authentication, a verification-purpose fingerprint image used as verification-purpose biometric information for effecting one-to-many authentication and inputs the sampled image to the CPU 11 (21).

The verification-purpose fingerprint data extracting section (a verification-purpose feature information extracting section) 11*a* (21*a*) is for extracting verification fingerprint data (verification-purpose feature information) from the verification-purpose fingerprint image input by way of the fingerprint sensor 14 (24) through use of the Minutia method disclosed in, e.g., Japanese Patent Laid-Open NO. HEI 11-195119. The verification fingerprint data to be extracted are identical in type with the registered fingerprint data previously registered in the registration-purpose data storage section 15*b* (25*b*). In the embodiment, the verification fingerprint data correspond to information about feature points (minutiae) of ridges in the fingerprint image [the positions, types (end points and bifurcation points), and directions of the feature points and positions of the feature points obtained as a result of the features points being projected on the ridges].

The verification-purpose attribute information extracting section 11*b* (21*b*) is for extracting, from the verification-purpose fingerprint image input by the fingerprint sensor 14 (24), a plurality of types of verification-purpose attribute information which are different from the verification fingerprint data extracted from the verification-purpose fingerprint data extracting section 11*a* (21*a*). The verification-purpose attribute information extracting section 11*b* (21*b*) is provided with the attribute information extracting sections 11*b*-1 (21*b*-1), 11*b*-2 (21*b*-2), 11*b*-3 (21*b*-3), . . . for extracting attribute information for each type of verification-purpose attribute information to be extracted.

For instance, among the information items (1) to (7) provided below, attribute information items which are the same in type with the registration-purpose attribute information extracted by the registration-purpose attribute information extracting section 11*a* shown in FIG. 1 are extracted as the verification-purpose attribute information.

(1) The pattern type of a fingerprint in a verification-purpose fingerprint image;

(2) The geometry of a finger in the verification-purpose fingerprint image;

(3) The number of feature points extracted from the verification-purpose fingerprint image;

(4) The volume of registered fingerprint data (verification-purpose feature information) extracted from the verification-purpose fingerprint image;

(5) A processing time (computing time) required to extract the registered fingerprint data by means of the verification-purpose fingerprint data extracting section 11*a* (21*a*);

(6) The moisture content of the finger surface in the verification-purpose fingerprint image; and (7) The input environment information about the verification-purpose fingerprint image.

A method for extracting the verification-purpose attribute information items (1) to (7) is the same as the method for extracting the registration-purpose attribute information items (1) to (7) which has already been described in connection with item [2-1], and hence its explanation is omitted.

The registration-purpose data read control section 11*c* (21*c*) has the function of a verification priority level computation section to be described later. In accordance with the verification priority level computed by the function of the verification priority level computation section, the registration-purpose data read control section 11*c* (21*c*) sequentially reads the registered fingerprint data from the registration-purpose data storage section 15*b* (25*b*) and inputs the thus-read data to the verification processing section 11*d* (21*d*).

The verification priority level computation section is for computing verification priority levels of a plurality of registered fingerprint data sets previously stored in the registration-purpose data storage section 15*b* (25*b*) to be verified against the verification fingerprint data extracted by the verification-purpose fingerprint data extracting section 11*a* (21*a*), in accordance with the plurality of types of registration-purpose attribute information previously stored in the registration-purpose data storage section 15*b* (25*b*) associated with the registered fingerprint data and a plurality of types of verification-purpose attribute information items extracted by the verification-purpose attribute information extracting section 11*b* (21*b*). The verification priority level computation section computes and determines the verification priority level by means of any one of the following two types of technique (1), (2).

Technique (1): First, the plurality of types of verification-purpose attribute information items are compared with the plurality of types of registration-purpose attribute information items associated with the respective registered fingerprint data sets, to thus determine whether or not a coincidence exists between the information items. Of the plurality of types of registration-purpose attribute information items associated with the registered fingerprint data, weighting coefficients have been assigned in advance to registration-purpose information items determined to coincide with the verification-purpose attribute information items. The weighting coefficients are summed for each registered fingerprint data set. The resultant sum value is computed as an attribute information coincidence score of the registered fingerprint data. Thus, the verification priority level is determined in accordance with the magnitude of the attribute information coincidence computed for each registered fingerprint data set. This technique (1) will be described specifically by reference to FIGS. 13 and 14.

Technique (2): Like Technique (1), a determination is made as to whether or not coincidence exists between the plurality of types of verification-purpose attribute information items and the plurality of types of registration-purpose attribute information items associated with the respective registered fingerprint data sets, by comparing the information items with each other. Verification priority levels are determined in accordance with the priority levels previously imparted to the registration-purpose attribute information items, which are determined to coincide with the verification-purpose attribute information, among the plurality of types of registration-purpose attribute information items. The registered fingerprint data are sorted in accordance with the verification priority levels. This technique (2) will be described specifically by reference to FIGS. 16 to 18.

The verification processing section (verification section) 11*d* (21*d*) sequentially verifies the verification fingerprint data extracted by the verification-purpose fingerprint data extracting section 11*a* (21*a*) in accordance with the verification priority levels computed by the function of the verification priority level computing section, thereby specifying the fingerprint data coinciding with the verification fingerprint data from the plurality of registered fingerprint data sets, and reports the result of verification (the result of specification) to the verification result output section 13 (23).

In reality, the verification processing section 11*d* (21*d*) sequentially verifies the verification fingerprint data against the registered fingerprint data read from the registration-purpose data storage section 15*b* (25*b*) by means of the registration-purpose data read control section 11*c* (21*c*), thereby automatically effecting verification complying with the verification priority level.

For example, a common method, such as the Minutia method or the pattern patching method, is used as a fingerprint verification scheme of the verification processing section 11d (21d). However, the method is not limited particularly to these methods, and any fingerprint verification method may be adopted.

The verification processing section 11d (21d) specifies verification fingerprint data by means of any one of the following two types of techniques (i), (ii).

Technique (i): Verification of the verification fingerprint data against the respective registered fingerprint data sets is completed upon appearance of the registered fingerprint data set coinciding with the verification fingerprint data while satisfying predetermined standards. The registered fingerprint data set satisfying the predetermined standards is specified as coinciding with the verification fingerprint data. This technique (i) will be specifically described by reference to FIG. 12.

Technique (ii): The registered fingerprint data sets whose verification priority levels computed by means of the registration-purpose data read control section 11c (21c) are higher than a reference level are grouped as a verification object group. The verification fingerprint data are verified against all of the registered fingerprint data sets belonging to the verification object group. The registered fingerprint data set that is determined to have the highest degree of coincidence as a result of verification is specified as information coinciding with the verification-purpose feature information. This technique (ii) will be specifically described by reference to FIG. 15.

The verification result output section 13 (23) is realized by the input/output interface 13 (23) shown in FIG. 3 (FIG. 4), and outputs the verification result (the specification result) reported by the verification processing section 11d (21d).

In the fingerprint authentication apparatus 10 shown in FIG. 3, the function of the registration-purpose biometric information input section and the function of the verification-purpose biometric information input section are realized by the single fingerprint sensor (the biometric information input section) 14. The function of the registration-purpose feature information extracting section and the function of the verification-purpose feature information extracting section are realized by the single fingerprint data extracting section (the feature information extracting section) 11a. The function of the registration-purpose attribute information extracting section and the function of the verification-purpose attribute information extracting section are realized by the single attribute information extracting section 11b.

[2-3] Others

The previously-described fingerprint/verification program (the biometric information registration/verification program) 15a, the fingerprint registration program (the biometric information registration program) 15c, and the fingerprint verification program (the biometric information verification program) 25a are provided while being recorded on a computer-readable recording medium; e.g., a flexible disk, a CD-ROM, a CD-R, a CD-RW, a DVD, or the like. In this case, the computer (CPU 11, 21) reads the programs 15a, 15c, and 25a from the recording medium and stores the programs in an internal storage device or transfers the programs to an external storage device, to thus execute the programs. The programs 15a, 15c, and 25a may be recorded in a storage device (recording medium); e.g., a magnetic disk, an optical disk, or a magneto-optical disk, and provided to the computer (CPU 11) from the storage device over a communications line.

Here, the computer is a concept encompassing hardware and an operating system and signifies hardware which operates under control of the operating system. Moreover, when the operating system is not required and when hardware is operated by means of only an application program, the hardware itself corresponds to a computer. The hardware is equipped with, at least, a microprocessor such as a CPU, and means for reading a computer program recorded on a recording medium. The application program includes a program code for causing the computer to implement the fingerprint authentication apparatus 10, 10A and the fingerprint authentication server 20. A part of the functions may be embodied by the operating system rather than by the application program.

In addition to the previously-described flexible disk, the CD-ROM, the CD-R, the CD-RW, the DVD, the magnetic disk, the optical disk, and the magneto-optical disk, various computer-readable mediums, such as an IC card, an ROM cartridge, a magnetic tape, a punch card, an internal storage device (memory such as RAM or ROM) in a computer, an external storage device, or a printed product on which is printed a code such as a barcode, can be utilized as the recording medium of the present embodiment.

[3] Operation of the Embodiment

Operation of the previously-described fingerprint authentication system of the embodiment (the fingerprint data registration apparatus and a fingerprint data verification apparatus) will be described by reference to FIGS. 11 to 18.

[3-1] Fingerprint Data Registration Procedures

Operation of the fingerprint data registration apparatus (i.e., fingerprint data registration procedures) shown in FIG. 1 will be described in accordance with the flowchart (steps S11 to S17) shown in FIG. 11.

When the registered fingerprint data to be used for one-to-many authentication are registered, the subject of registration inputs a fingerprint image by way of the fingerprint sensor 14 (step S11). Registered fingerprint data are extracted from the input fingerprint image by means of the registration-purpose fingerprint data extracting section 11a (step S12). A plurality of registration-purpose attribute information items are extracted by means of the registration-purpose attribute information extracting section 11b (steps S13 to S16).

First, a first item of attribute information (an attribute item) is called up at the time of registration of the registration-purpose attribute information (step S13). Registration-purpose attribute information corresponding to the item is extracted by the attribute extracting section 11b-1 (step S14), to thus determine whether or not the attribute item is the final attribute item (step S15). If the attribute item is not the final attribute item (when NO is selected in step S15), the next attribute item will be called up (step S16). Registration-purpose attribute information corresponding to the attribute item is extracted by means of the attribute extracting sections 11b-2, 11b-3, . . . (step S14).

When all of the plurality of types of previously-designated registration-purpose attribute information items have been extracted through repetition of these extracting operations (when YES is selected in step S15), the registration section 11e associates the registered fingerprint data extracted by the registration-purpose fingerprint data extracting section 11a and the plurality of types of registration-purpose attribute information items extracted by the registration-purpose attribute information extracting section 11b with the ID of the subject of registration, whereby the data and information are registered as a database of table format, such as that shown in FIG. 5, in the registration-purpose data storage section 15b (25b) (step S17).

[3-2] Fingerprint Data Verification Procedures

In accordance with the flowchart (steps S21 to S35) shown in FIG. 12, operation of the fingerprint data verification apparatus shown in FIG. 2 (i.e., fingerprint data verification procedures) will be described.

When verification is performed, the subject of authentication inputs a fingerprint image by way of the fingerprint sensor 14 (24) (step S21). Verification fingerprint data are extracted from the input fingerprint image by means of the verification-purpose fingerprint data extracting section 11a (21a), and the extracted fingerprint data are input to the verification processing section 11d (21d) (step S22). Further, a plurality of verification-purpose attribute information items are extracted by means of the verification-purpose attribute information extracting section 11b (21b) (step S23 to S26).

At the time of extracting of the verification-purpose attribute information, the first item of the attribute information (attribute item) is called up (step S23), and the verification-purpose attribute information corresponding to the item is extracted by the attribute extracting section 11b-1 (21b-1) (step S24), thereby determining whether or not the attribute item is final (step S25). If the attribute item is not the final attribute item (when NO is selected in step S25), the next attribute item is called up (step S26). The verification-purpose attribute information corresponding to the attribute item is extracted by the attribute extracting sections 11b-2 (21b-2), 11b-3 (21b-3), . . . (step S24).

When all of the plurality of types of previously-designated verification-purpose attribute information items have been extracted through repetition of these extracting operations (when YES is chosen in step S25), a determination is made as to whether or not coincidence exists between the attribute information items, through use of Technique (1) by means of the function of the registration-purpose data read control section 11c (21c) serving as the verification priority computation section, and an attribute information coincidence score is computed (step S27, which will be described in detail later). Verification priority levels of the plurality of sets of registered fingerprint data are computed and determined (step S28).

The registered fingerprint data are sequentially read from the registration-purpose data storage section 15b (25b) by the registration-purpose data read control section 11c (21c) in accordance with the verification priority level, and the thus-read data are input to the verification processing section 11d (21d). The verification processing section 11d (21d) specifies fingerprint data coinciding with the verification fingerprint data from the plurality of registered fingerprint data sets, through use of Technique (i) in the following manner (steps S29 to S33).

First, the registration-purpose data read control section 11c (21c) reads, from the registration-purpose data storage section 15b (25b), the first registered fingerprint data set; that is, the registered fingerprint data having the highest attribute information coincidence score and the highest verification priority level (step S29). The verification processing section 11d (21d) verifies the first registered fingerprint data against the verification fingerprint data extracted by the verification-purpose fingerprint data extracting section 11a (21a) (step S30).

On the basis of the result of verification, the verification processing section 11d (21d) determines whether or not the verification fingerprint data and the registered fingerprint data satisfy the predetermined standards; that is, whether or not the fingerprint of the subject of authentication is the fingerprint of the person who has registered the registered fingerprint data (step S31).

When the fingerprint is determined not to be the fingerprint of the person (when NO is selected in step S31), a determination is then made as to whether or not the registered fingerprint data set—which is the object of verification—is a final fingerprint data set (step S32). When the registered fingerprint data set is determined not to be final fingerprint data set (when NO is selected in step S32), the registration-purpose data read control section 11c (21c) reads the registered fingerprint data set having the next highest verification priority level from the registration-purpose data storage section 15b (25b) (step S33), and processing analogous to that mentioned previously (steps S30 to S32) is then performed.

When the registered fingerprint data set is determined to the fingerprint of the person in step S31 (when YES is selected), the fingerprint data set coinciding with the verification fingerprint data is specified among the plurality of sets of registered fingerprint data. The verification result indicating that the subject of authentication is the registered person is output from the verification result output section 13 (23) (step S34), whereupon verification processing is terminated.

As mentioned previously, the verification processing section 11a (21a) terminates verification of the verification fingerprint data against the respective registered fingerprint data sets upon appearance of the registered fingerprint data coinciding with the verification fingerprint data set while satisfying the predetermined standards has appeared; that is, when YES is selected in step S31, and specifies the registered fingerprint data set satisfying the predetermined standards as fingerprint data coinciding with the verification fingerprint data. Specifically, in the verification procedures shown in FIG. 12, the registered fingerprint data are verified against the verification fingerprint data according to the verification priority levels. The registered fingerprint data having first satisfied the verification standards are approved as belonging to the subject of authentication, thereby identifying the subject of authentication as the registrant.

In contrast, when the registered fingerprint data are determined to be final fingerprint data in step S32 (when YES is selected), specification of fingerprint data coinciding with the verification fingerprint data while satisfying the predetermined standards among the plurality of sets of registered fingerprint data has ended in failure. A result indicating that the fingerprint of the subject of authentication is not registered as registered fingerprint data (a result indicating that identification has ended in failure) is output from the verification result output section 13 (23) (step S35), and verification processing is completed.

[3-3] Verification Priority Level Computation Procedures

By reference to FIGS. 13 and 14, the verification priority level computation procedures of the embodiment; that is, processing procedures to be performed by the function of the verification priority level computation section of the registration-purpose data read control section 11c (21c) in step S27 in FIG. 12, will be described in more detail.

Here, as shown in FIG. 13, data analogous to those described in connection with the embodiment shown in FIG. 5 are assumed to be registered in the registration-purpose data storage section 15b (25b). Specifically, the registered fingerprint data (fingerprint data 1, fingerprint data 2, and fingerprint data 3), the attribute information "a" (e.g., a pattern type: attributes a1, a2, and a3), the registration-purpose attribute information "b" (e.g., the number of feature points; attributes b1, b2, and b3), and the registration-purpose attribute information "c" (e.g., moisture contents; attributes c1, c2, and c3) are registered in association with the IDs (ID1, ID2, and ID3) of the respective fingerprint registrants. As shown in FIG. 13, weighting coefficients 3, 2, 1 are previously imparted to the registration-purpose attribute information items "a," "b," and "c." These weighting coefficients are determined in consideration of the detection accuracy of the respective attribute information items, variations in data, or the like.

A determination as to coincidence/noncoincidence is rendered by comparing the verification-purpose attribute information with the registration-purpose attribute information. Consequently, three attributes a2, b2, and c2 pertaining to ID2 are assumed to coincide with the verification-purpose attribute information items "a," "b," and "c." Two attributes a1 and c1 pertaining to ID1 are assumed to coincide with the verification-purpose attribute information "a" and "c." An attribute b3 pertaining to ID3 is assumed to coincide with the verification-purpose attribute information "b." In FIG. 14, an underlined attribute is assumed to be an attribute having coincided with the verification-purpose attribute information.

Subsequently, the registration-purpose data read control section 11c (21c) sums the weighting coefficients previously imparted to the attributes having coincided with the verification-purpose attribute information, and computes the sum value as an attribute coincidence score of the respective set of registered fingerprint data. Accordingly, in the embodiment shown in FIG. 14, the attribute coincidence score of the fingerprint data 2 pertaining to ID2 comes to 3+2+1=6. The attribute coincidence score of the fingerprint data 1 pertaining to ID1 comes in 3+1=4. The attribute coincidence score of the fingerprint data 3 pertaining to ID3 comes to 2. In FIG. 14, data are sorted in decreasing order of the attribute coincidence scores computed in the manner mentioned previously. In the embodiment, the data having higher attribute coincidence score are taken as having a higher verification priority level.

[3-4] Modification of Fingerprint Data Verification Procedures

In accordance with the flowchart (steps S21 to S26 and S50 to S62) shown in FIG. 15, a modification of operation of the fingerprint data verification apparatus shown in FIG. 2 will be described.

Even in this modification, as in the case of the operation (procedures) previously described by reference to FIG. 12, the subject of authentication inputs a fingerprint image by way of the fingerprint sensor 14 (24) (step S21). Verification fingerprint data are extracted from the input fingerprint image by means of the verification-purpose fingerprint data extracting section 11a (21a), and the extracted fingerprint data are input to the verification processing section 11d (21d) (step S22). Further, a plurality of verification-purpose attribute information items are extracted by means of the verification-purpose attribute information extracting section 11b (21b) (step S23 to S26).

When all of the plurality of types of previously-designated verification-purpose attribute information items have been extracted (when YES is selected in step S25), a determination is made as to whether or not coincidence exists between the attribute information items through use of Technique (2) by means of the function of the registration-purpose data read control section 11c (21c) serving as the verification priority computation section. Verification priority levels of a plurality of registration-purpose fingerprint data sets are computed (the registered fingerprint data sets are actually sorted) on the basis of the result of coincidence determination (step S50).

The verification processing section 11d (21d) groups, as a verification object group, the registered fingerprint data sets (the registered fingerprint data sets given higher levels as a result of sorting of the registered fingerprint data) whose verification priority levels computed by the registration-purpose data read control section 11c (21c) are higher than the standard levels. The number of registered fingerprint data sets belonging to the verification object group is set as a preset value "an" (step S51).

Subsequently, the registration-purpose data read control section 11c (21c) sequentially reads the registered fingerprint data sets belonging to the verification object group from the registration-purpose data storage section 15b (25b) and inputs the thus-read data sets into the verification processing section 11d (21d). The verification processing section 11d (21d) specifies the fingerprint data coinciding with the verification fingerprint data among the plurality of registered fingerprint data through use of Technique (ii) in the following manner (steps S52 to S60).

First, the registration-purpose data read control section 11c (21c) reads, from the registration-purpose data storage section 15b (25b), the first registered fingerprint data set; that is, the registered fingerprint data set having the highest attribute information coincidence score and the highest verification priority level (step S52). After initial setting (N=1) has been performed (step S53), the verification processing section 11d (21d) verifies the first registered fingerprint data set against the verification fingerprint data extracted by the verification-purpose fingerprint data extracting section 11a (21a) (step S54).

A determination is then made as to whether or not the coincidence score showing the degree of coincidence existing between the registered fingerprint data and the verification-purpose fingerprint data set is the highest score (larger than the highest coincidence score acquired previously) (step S55). When the coincidence score is the highest score (when YES is selected in step S55; the coincidence score naturally become the highest for the first registered fingerprint data), the coincidence score is held as the highest score (step S56).

When the coincidence score acquired this time is determined not to be the highest score (when NO is selected in step S56) or after the highest score is held, a determination is made as to whether or not N is equal to or greater than the preset value "n" set in step S51; that is, whether or not verification of the verification fingerprint data against all of the registered fingerprint data sets belonging to the verification object group has been completed (Step S57).

When N is smaller than the preset value "n" (when NO is selected in step S57), N+1 is set as N (step S58), and the registration-purpose data read control section 11c (21c) reads the next registered fingerprint data set belonging to the verification-object group from the registration-purpose data storage section 15b (25b) (step S59), and processing analogous to that mentioned previously is performed (steps S54 to S57).

When N is determined to be equal to the preset value "n" or higher in step S57; that is, when verification of the verification fingerprint data against all of the registered fingerprint data sets belonging to the verification object group has been completed (when YES is selected in step S57), the verification processing section 11d (21d) determines whether or not the final highest score held in the step S56 is equal to or higher than a given score which enables identification of the subject of authentication; that is, whether or not the fingerprint of the subject of authentication is the fingerprint of the registrant of the registered fingerprint data having acquired the highest score (step S60).

When in step S60 the fingerprint is determined to be the fingerprint of the authenticated person (when YES is selected), the fingerprint data set matching the verification fingerprint data is specified among the plurality of registered fingerprint data (the verification object group). The verification result indicating that the subject of authentication is the registrant is output from the verification result output section 13 (23) (step S61), and verification processing is terminated.

When in step S60 the final highest score held in step S56 is determined to be less than the predetermined score (when NO is selected), the registered fingerprint data set coinciding with the verification fingerprint data cannot be specified among the verification object group. The held highest score is discarded, and a signal indicating that the fingerprint of the subject of authentication is not registered as registered fingerprint data (identification has ended in failure) is output from the verification result output section 13 (23) (step S62), and verification processing is completed.

Figure 15:
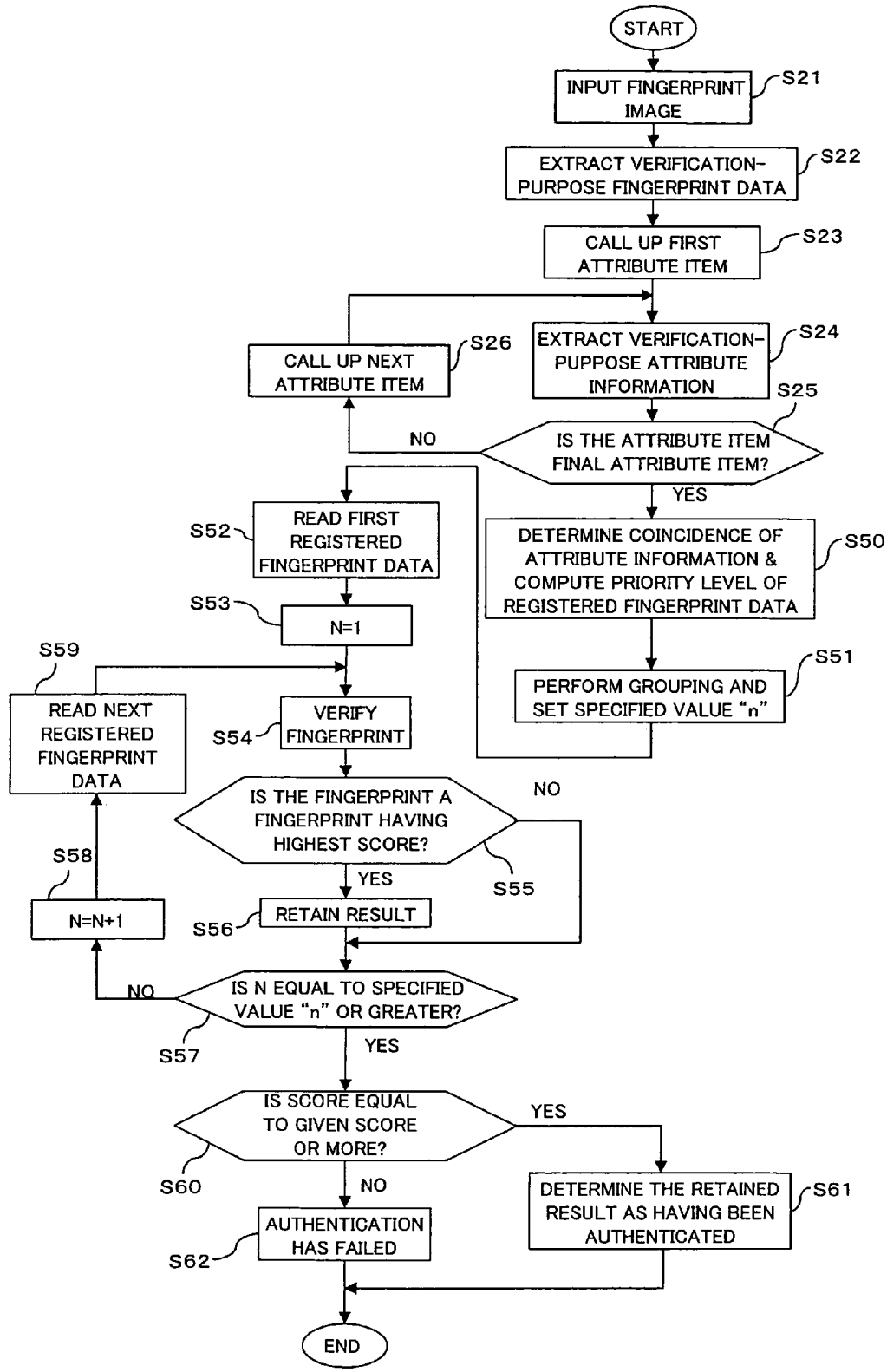
FIG. 15 is a flowchart for describing a modification of fingerprint data verification procedures (operation of a fingerprint data verification apparatus) of the embodiment.

As mentioned previously, according to the verification procedures shown in FIG. 15, the verification fingerprint data are verified against all of the registered fingerprint data sets belonging to the verification object group. When the registered fingerprint data set that has been acquired as a result of verification and has the highest degree of coincidence satisfies the predetermined verification standards, the registered fingerprint data are authenticated as belonging to the subject of authentication, and the subject of authentication is identified as the registrant.

In the case of general verification of a fingerprint, the degree of coincidence is represented as a score as mentioned previously. When the score is higher than a given score, the subject of authentication is identified. According to the verification procedures shown in FIG. 12, verification is performed in accordance with the verification priority levels. When verification has attained success, the subject of authentication is identified as the authenticated person. Therefore, as compared with a case where verification is performed at random on a round-robin basis, the probability of the specified registered fingerprint data being the fingerprint of the authenticated person is considerably high. However, there still exists a small chance of the specified registered fingerprint data being identified as belonging to another person.

Therefore, according to the verification procedures shown in FIG. 15, the registered fingerprint data are grouped, and the group having the highest verification priority level is taken as a verification object group. The registered fingerprint data set having the highest score in the verification object group is specified as belonging to the subject of authentication, thereby considerably diminishing the chance of another person being erroneously identified.

[3-5] Modification of Verification Priority Level Computation Procedures

By reference to FIGS. 16 to 18, a modification of the verification priority level computation procedures of the present embodiment; that is, procedures for sorting the registered fingerprint data in step S50 shown in FIG. 15 which are performed by the function of the registration-purpose data read control section 11*c* (21*c*) serving as the verification priority level computation section, will be described in greater detail.

Figures 16, 17:
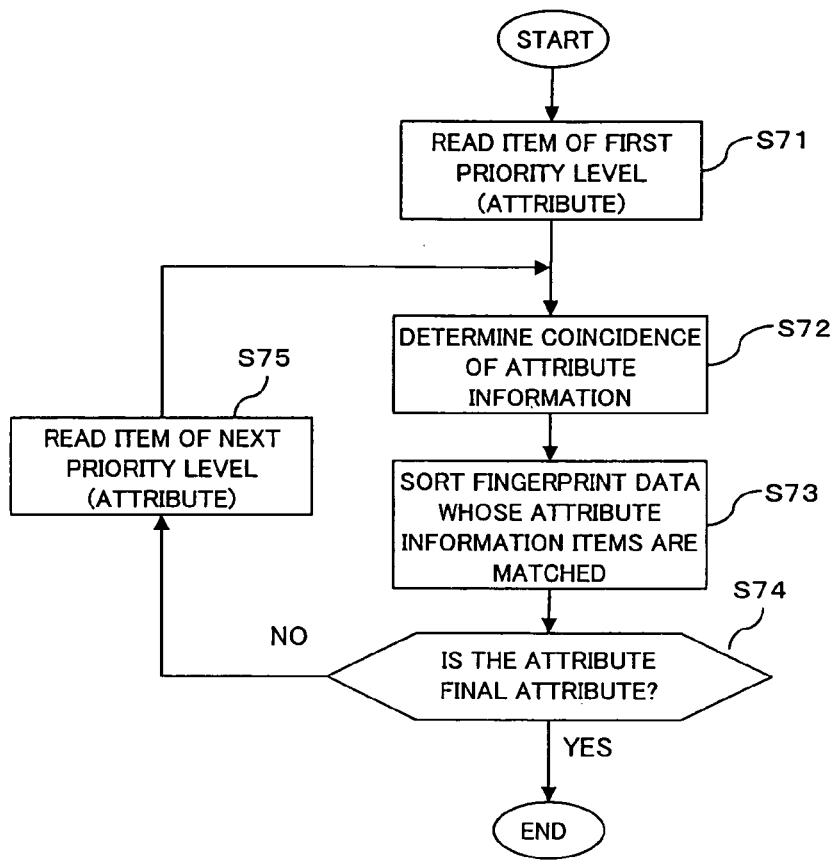

As shown in FIG. 17, data analogous to those described in connection with the embodiments shown in FIGS. 5, 13, and 14 are registered in the registration-purpose data storage section 15*b* (25*b*). Specifically, the registered fingerprint data set (fingerprint data set 1, fingerprint data set 2, and fingerprint data set 3), the attribute information "a" (e.g., a pattern type: attributes a1, a2, and a3), the registration-purpose attribute information "b" (e.g., the number of feature points; attributes b1, b2, and b3), and the registration-purpose attribute information "c" (e.g., moisture content; attributes c1, c2, and c3) are registered in association with the IDs (ID1, ID2, and ID3) of the respective fingerprint registrants. As shown in FIG. 17, weighting coefficients 2, 1, 3 are previously imparted to the registration-purpose attribute information items "a," "b," and "c." These weighting coefficients are determined in consideration of the detection accuracy of the respective attribute information items, variations in data, or the like.

Procedures for sorting the registered fingerprint data will be described in accordance with the flowchart shown in FIG. 16 (steps S71 to S75). First, attribute information about the first priority level item (the attribute information "b" in the embodiment shown in FIG. 17) is read from the registration-purpose data storage section 15*b* (25*b*) (step S71). A determination as to coincidence/noncoincidence is rendered by comparing the verification-purpose attribute information "b" with the registration-purpose attribute information items "b1, b2, and b3" (step S72). The registered fingerprint data are sorted on the basis of the result of determination (step S73).

Subsequently, a determination is made as to whether or not the item of the attribute information which has been subjected to coincidence determination is the final item (the item having the lowest priority level) (step S74). When the item is not the final item (when NO is selected in step S74), attribute information about the item of next priority level is read from the registration-purpose data storage section 15*b* (25*b*) (step S75). Processing analogous to that mentioned previously is repeatedly performed (steps S72 to S74). When in step S74 the item of the attribute information is determined to be the final item (when YES is selected in step S74), sorting operation is completed.

By means of such a sorting operation, in the embodiment shown in FIG. 17 the groups are classified into a group (fingerprint data sets 2 and 3) for which a coincidence exists between the verification-purpose attribute information "b" and the registration-purpose attribute information items b1, b2, and b3 and a group (fingerprint data set 1) for which no coincidence exists between the verification-purpose attribute information "b" and the registration-purpose attribute information items b1, b2, and b3. Next, the group (the fingerprint data set 2 and 3) for which a coincidence exists between the verification-purpose attribute information "b" and the registration-purpose attribute information items is further classified into a group (the fingerprint data 2) for which a coincidence exists between the verification-purpose attribute information "a" and the registration-purpose attribute information a2, a3 and a group (the fingerprint data 3) for which a coincidence does not exist between the verification-purpose attribute information "a" and the registration-purpose attribute information a2, a3. As a result, the attribute information items are sorted in such an order as shown in FIG. 17. The highest group includes the fingerprint data set 2; the second group includes the fingerprint data set 3; and the third group includes the fingerprint data set 1. Even in FIG. 17, underlined attributes are taken as coinciding with the verification-purpose attribute information items.

In the embodiment shown in FIG. 17, the number of registered fingerprint data sets is only three. Therefore, the registered fingerprint data sets are classified into three groups. However, in a case where a plurality of registered fingerprint data sets are registered, the data are classified into a maximum of eight groups, as shown in FIG. 18. In FIG. 18, as in the case of the embodiment shown in FIG. 17, three types of registration-purpose attribute information items "a," "b," and "C" are assumed to be associated with the registered fingerprint data sets, and priority levels 2, 1, and 3 are assumed to be previously assigned to the registration-purpose attribute information items "a," "b," and "C." Under these assumptions, the highest group is a group of registered fingerprint data sets for which all of the attribute information items "a," "b," and "c" have coincided with the verification-purpose attribute information; the second group is a group of registered fingerprint data sets for which the two attribute information items "a" and "b" have coincided with the verification-purpose attribute information; a third group is a group of registered fingerprint data sets for which the two attribute information items "b" and "c" have coincided with the verification-purpose attribute information; a fourth group is a group of registered fingerprint data sets for which only the attribute information item "b" has coincided with the verification-purpose attribute information; a fifth group is a group of registered fingerprint data sets for which the two attribute information items "a" and "c" have coincided with the verification-purpose attribute information; a sixth group is a group of registered fingerprint data sets for which only the attribute information item "a" has coincided with the verification-purpose attribute information; a seventh group is a group of registered fingerprint data sets for which only the attribute information item "c" has coincided with the verification-purpose attribute information; and an eighth group is a group of registered fingerprint data sets for which no attribute information has coincided with the verification-purpose attribute information.

Grouping operations may first be performed by means of the function of the verification priority level computation section, and the verification processing section 11$d$ (21$d$) may select only the highest group as a verification object group or select the plurality of higher groups as verification object groups.

[4] Modification of the Fingerprint Data Verification Apparatus

FIG. 19 is a block diagram showing the functional configuration of a modification of the fingerprint data verification apparatus (the biometric information verification apparatus) of the present embodiment. The fingerprint data verification apparatus shown in FIG. 19 is configured in substantially the same manner as is the fingerprint data verification apparatus shown in FIG. 2. However, the fingerprint data verification apparatus shown in FIG. 19 is further provided with an attribute information change section 11$f$ (21$f$) and a data management section 11$g$ (21$g$).

Unparenthesized reference numerals in FIG. 19 and the following descriptions are assigned to the functional configurations realized by the hardware configuration (the fingerprint authentication apparatus 10) shown in FIG. 3. Parenthesized reference numerals are assigned to the functional configuration realized by the hardware configuration (the fingerprint authentication system) shown in FIG. 4. Further, the function of the attribute information change section 11$f$ (21$f$ and the function of the data management section 11$g$ (21$g$) are realized by means of the CPU 11 (21) executing the fingerprint registration/verification program 15$a$ (the fingerprint verification program 25$a$).

Now, the attribute information change section 11$f$ (211$f$ acts as a change section capable of changing or updating the registration-purpose attribute information in the registration-purpose data storage section 15$b$ (25$b$) to the verification-purpose attribute information extracted by the verification-purpose attribute information extracting section 11$b$ (21$b$) when the verification processing section 11$d$ (21$d$) has specified the registered fingerprint data set coinciding with the verification fingerprint data among the plurality of registered fingerprint data sets (when verification has attained success and the subject is identified).

Of the attribute information items, some have universal properties (e.g., a pattern type or the number of feature points) and some change in accordance with the circumstances (e.g., a moisture content of the finger surface or input environment information). For this reason, when the attribute value has changed at the time of verification from that acquired during registration, the attribute information change section 11$f$(21$f$) changes or updates the registration-purpose attribute information in the registration-purpose data storage section 15$b$ (25$b$) to a value obtained during verification, thereby enhancing the determination accuracy of the verification priority level further. However, as mentioned previously, such change or updating operation is performed limitedly when verification has attained success and the subject is identified.

Here, the data management section 11$g$ (21$g$) functions as a management section which manages and monitors the number of registered fingerprint data sets in the registration-purpose data storage section 15$b$ (25$b$) and changes the number of types of registration-purpose attribute information verification-purpose attribute information used when the registration-purpose data read control section 11$c$ (21$c$) computes the verification priority level in accordance with the number of registered fingerprint data sets.

When the number of registered fingerprint data sets registered in the registration-purpose data storage section 15$b$ (25$b$) is small, there may be a case where the processing time required to compute the verification priority levels using the attribute information items accounts for a large proportion of the total time required by verification processing. For this reason, the data management section 11$g$ (21$g$) controls the number of types of attribute information items used for computing the verification priority levels, in accordance with the number of registered fingerprint data sets, thereby optimizing the processing time. Specifically, when the number of registered fingerprint data sets is small, the number of types of attribute information used for computing the verification priority levels is reduced.

[5] Advantage of the Present Embodiment

According to the fingerprint data registration apparatus, the fingerprint data verification apparatus, and the fingerprint authentication system, all belonging to the previously-described embodiments, when one-to-many authentication is performed using a fingerprint image, the verification priority levels of the plurality of registered fingerprint data sets are computed on the basis of the plurality of types of registration-purpose attribute information associated with the respective registered fingerprint data sets and the plurality of types of verification-purpose attribute information items extracted from the fingerprint image of the subject of authentication. In accordance with the computed verification priority levels, the fingerprint data extracted from the fingerprint image of the subject of authentication are sequentially verified against the registered fingerprint data sets, and the registered fingerprint data set coinciding with the verification fingerprint data is specified among the plurality of registered fingerprint data sets.

As mentioned above, when the registered fingerprint data sets have the higher verification priority level determined on the basis of the plurality of types of attribute information items, the probability of the registered fingerprint data coinciding with the fingerprint data pertaining to the subject of authentication is high. Accordingly, even if the verification fingerprint data are not verified against all of the registered fingerprint data sets on a round-robin basis when one-to-many authentication is performed, the registered fingerprint data set pertaining to the subject of authentication can be determined, so long as verification is performed in accordance with the verification priority levels and a certain degree of coincidence is achieved. The time (number of verification operations) required to effect verification processing can be significantly diminished, and verification accuracy can be enhanced.

When randomly-sorted registered fingerprint data sets are sequentially used for verification as in the related art, there still exists a chance of erroneous verification (verification which allows erroneous acceptance of verification fingerprint data of another person), and hence the subject is identified only when the degree of coincidence obtained as a result of verification—for which the level of verification standards is set considerably high—as exceeded the level or when the registered fingerprint data set that has the highest degree of coincidence after the verification fingerprint data have been verified against all of the registered fingerprint data sets on a round-robin basis is specified as belonging to the authenticated person. In the former case, the subject can be reliably identified when the level of verification standards has been exceeded the verification standards. However, when the level of the verification standards is too high, the possibility of a failure in authentication is high and not practical. In the latter case, the verification fingerprint data must be verified against all of the registered fingerprint data sets, and verification processing involves consumption of too much time.

In contrast, according to the present embodiment, when one-to-many fingerprint authentication is performed, the verification fingerprint data are verified against the registered fingerprint data sets in decreasing sequence of registered fingerprint data having a high probability of coincidence, in accordance with the verification priority levels determined by the plurality of attribute information items. Hence, the time (the number of verification operations) required for verification processing can be curtailed to a great extent. Practical personal authentication can be performed with a considerably high degree of accuracy, depending on the fingerprint data and the plurality of attribute information items.

Further, as mentioned previously, when the verification procedures such as those shown in FIG. 15 are used, the registered fingerprint data sets are grouped, and the group having the highest verification priority level is taken as a verification object group, and the registered fingerprint data set having the highest score in the verification object group is specified as belonging to the subject of authentication. Hence, the possibility of erroneous authentication of another person can be drastically diminished, to thus enhance verification accuracy.

[6] Others

The present invention is not limited to the previously-described embodiment but can be carried out while being modified in various manners within the scope of the gist of the present invention.

For instance, the previous embodiments have described a case where the biometric information is a fingerprint image. However, the present invention is not limited to the embodiments. Even when the biometric information is a palm pattern, an iris (iris muscle pattern), a voice, a facial image, a vascular pattern (a retinal vascular pattern, or a vein pattern), a dynamic signature, or a keystroke, the present invention is applied in the same manner as mentioned previously. Thereby, the same working-effect as that achieved in the previously-described embodiment can be acquired.

The previously-described embodiment has described the case where the plurality of attribute information items are three types: for instance, a pattern type, the number of feature points, and a moisture content. However, the present invention is not limited to this embodiment. So long as two or more of the previously-described (1) to (7) attribute information items are used, the same working-effect as that yielded in the previously-described embodiment can be acquired.

Here, a determination as to coincidence/noncoincidence between the attribute information items is performed in reality as follows. A determination as to whether or not the pattern type and the input environment information has achieved a coincidence is made on the basis of whether or not the verification-purpose attribute information and the registration-purpose attribute information coincide perfectly. A determination as to whether or not the shapes "x" and "y" coincide with each other is determined on the basis of whether or not a difference between the verification-purpose shapes "x" and "y" and the registration-purpose shapes "x" and "y" falls within a predetermined range or whether or not a difference between the ratio of the verification-purpose shape "x" to the verification-purpose shape "y" and the ratio of the registration-purpose shape "x" to the registration-purpose shape "y" fall within a predetermined range. A determination—as to whether or not a coincidence is acquired in terms of the number of feature points, the volume of data, a processing time, and the moisture content of a finger surface—is made on the basis of, e.g., whether or not a difference between the verification-purpose attribute values and the registration-purpose attribute values falls within a predetermined range.

INDUSTRIAL APPLICABILITY

As mentioned above, according to the present invention, verification is performed in accordance with verification priority levels although the verification-purpose feature information is not verified against all of the registration-purpose feature information items on a round-robin basis when one-to-many authentication is performed using biometric information. If a certain degree of coincidence is acquired, the registration-purpose feature information about the subject of authentication can be determined. Thereby, the time required to verification processing (the number of verification operations) can be significantly diminished, and the verification accuracy can also be enhanced.

Therefore, the present invention is considered to be suitable for use with a system which authenticates the identity of a person by means of biometric information; for example, a fingerprint, a palm pattern, an iris, a voice, a facial image, a vascular pattern, a dynamic signature, or a keystroke, and to be considerably-highly useful.

What is claimed is:

1. A method for registering biometric information, comprising:
    (a) sampling, from a registered subject, registration-purpose biometric information to be used for one-to-many authentication and inputting the sampled information;
    (b) extracting registration-purpose feature information from the registration-purpose biometric information input in said step (a) of sampling;
    (c) extracting, from the registration-purpose biometric information input in said step (a) of sampling, a plurality of types of registration-purpose attribute information differing from the registration-purpose feature information; and
    (d) registering the registration-purpose feature information extracted in said step (b) of extracting and said plurality of types of registration-purpose attribute information extracted in said step (c) of extracting in associated with one another.

2. The method for registering biometric information according to claim 1, further comprising storing the registration-purpose feature information and the plurality of types of registration-purpose attribute information, which are registered in association with one another in said step (d) of registering.

3. The method for registering biometric information according to claim 1, wherein
the registration-purpose biometric information sampled and input in said step (a) of sampling comprise a fingerprint image from the registered subject;
the registration-purpose feature information extracted from the fingerprint image in said step (b) of extracting comprises information about at least feature points of ridges of the finger print image; and
the registration-purpose attribute information extracted in said step (c) of extracting comprises at least two of a pattern type of a fingerprint of the fingerprint image, the geometry of a finger of the fingerprint image, the number of the feature points, the volume of data pertaining to the feature information, a processing time required in said step (b) of extracting to extract information about the feature points, the quantity of moisture on the surface of the finger in the fingerprint image, and input environment information of the fingerprint image.

4. A method for verifying biometric information, comprising:
(a) sampling, from a subject of authentication, verification-purpose biometric information to be used for one-to-many authentication and inputting the sampled information;
(b) extracting verification-purpose feature information from the verification-purpose biometric information input in said step (a) of sampling;
(c) extracting, from the verification-purpose biometric information input in said step (a) of sampling, a plurality of types of verification-purpose attribute information differing from the verification-purpose feature information;
(d) computing verification priority levels of a plurality of registration-purpose feature information items to be verified against the verification-purpose feature information extracted in said step (b) of extracting, on the basis of a plurality of types of registration-purpose attribute information associated with the plurality of registration-purpose feature information items and the plurality of types of verification-purpose attribute information extracted in said step (c) of extracting; and
(e) verifying said verification-purpose feature information extracted in said step (b) of extracting successively against the plurality of registration-purpose feature information items in accordance with the verification priority levels computed in said step (d) of computing, to thus specify information, which coincides with said verification-purpose feature information, from among the plurality of registration-purpose feature information items.

5. The method for verifying biometric information according to claim 4, wherein said step (d) of computing comprises:
comparing the plurality of types of verification-purpose attribute information with the plurality of types of registration-purpose attribute information associated with the respective registration-purpose feature information items, to thus determine whether or not a coincidence exists between said information items;
summing, for each said registration-purpose feature information item, weighting coefficients previously assigned to registration-purpose attribute information, which is determined to coincide with the verification-purpose attribute information, among said plurality of types of registration-purpose attribute information associated with the registration-purpose feature information items, to thus compute a sum value of the weighting coefficients as an attribute information coincidence score pertaining to said registration-purpose feature information items; and
determining the verification-purpose priority levels in accordance with said attribute information coincidence scores.

6. The method for verifying biometric information according to claim 4, wherein said step (d) of computing comprises:
comparing the plurality of types of verification-purpose attribute information with the plurality of types of registration-purpose attribute information associated with the respective registration-purpose feature information items, to thus determine whether or not a coincidence exists between said information items; and
determining the verification priority levels in accordance with a priority level previously assigned to said information, which is determined to coincide with the verification-attribute information, among the plurality of types of registration-purpose attribute information.

7. The method for verifying biometric information according to claim 4, wherein said step (e) of verifying comprises:
completing verification of the verification-purpose feature information against the respective registration-purpose feature information items at a point in time when a registration-purpose feature information item, which coincides with the verification-purpose feature information while satisfying a predetermined standard, appears; and
specifying the registration-purpose feature information item satisfying the predetermined standard as information coinciding with the verification-purpose feature information.

8. The method for verifying biometric information according to claim 4, wherein said step (e) of verifying comprises:
grouping, as a verification object group, registration-purpose feature information items whose verification priority levels computed in said step (d) of computing are higher than a reference level;
verifying the verification-purpose feature information against all of registration-purpose feature information items belonging to the verification object group; and
specifying, in accordance with a result of said verification, a registration-purpose feature information item having the highest coincidence as information coinciding with the verification-purpose feature information.

9. The method for verifying biometric information according to claim 4, further comprising changing or updating said registration-purpose attribute information to the verification-purpose feature information extracted in said step (c) of extracting when information coinciding with the verification-purpose feature information has been specified from among the plurality of registration-purpose feature information items in said step (e) of verifying.

10. The method for verifying biometric information according to claim 4, further comprising managing the number of said registration-purpose feature information items and changing, in accordance with the number, the number of types of said registration-purpose attribute information/said verification-purpose attribute information used when verification priority levels are computed in said step (d) of computing.

11. A method for registering/verifying biometric information, comprising:
(a) sampling, from a registered subject, registration-purpose biometric information to be used for one-to-many authentication and inputting the sampled information;

(b) extracting a registration-purpose feature information item from the registration-purpose biometric information input in said step (a) of sampling;

(c) extracting, from the registration-purpose biometric information input in step (a) of sampling, a plurality of types of registration-purpose attribute information differing from the registration-purpose feature information item;

(d) registering the registration-purpose feature information item extracted in said step (b) of extracting and said plurality of types of registration-purpose attribute information extracted in said step (c) of extracting in association with one another;

(e) storing, in a registration-purpose data storage section, the registration-purpose feature information item and the plurality of types of registration-purpose attribute information, which are registered in an associated with one another in said step (d) of registering;

(f) sampling, from a subject of authentication, verification-purpose biometric information to be used for one-to-many authentication and inputting the sampled information;

(g) extracting verification-purpose feature information from the verification-purpose biometric information input in said step (f) of sampling;

(h) extracting, from the verification-purpose biometric information input in said step (f) of sampling, a plurality of types of verification-purpose attribute information differing from the verification-purpose feature information;

(i) computing verification priority levels of a plurality of the registration-purpose feature information items which are stored in said step (e) of storing in the registration-purpose data storage section to be verified against the verification-purpose feature information extracted in said step (g) of extracting, on the basis of the plurality of types of registration-purpose attribute information, associated with the plurality of registration-purpose feature information items and the plurality of verification-purpose attribute information extracted in said step (h) of extracting; and (j) verifying the verification-purpose feature information extracted in said step (g) of extracting against the plurality of registration-purpose feature information items in accordance with the verification priority levels computed in said step (i) of computing, to thus specify information, which coincides with the verification-purpose feature information, from among the plurality of registration-purpose feature information items.

12. The method for registering/verifying biometric information according to claim 11, wherein said step (i) of computing comprises:

comparing the plurality of types of verification-purpose attribute information with the plurality of types of registration-purpose attribute information associated with the respective registration-purpose feature information items, to thus determine whether or not a coincidence exists between said information items;

summing, for each said registration-purpose feature information item, weighting coefficients previously assigned to registration-purpose attribute information, which is determined to coincide with the verification-purpose attribute information, among the plurality of types of registration-purpose attribute information associated with the registration-purpose feature information items, to thus compute a sum value of the weighting coefficients as an attribute information coincidence score pertaining to the registration-purpose feature information items; and determining the verification-purpose priority levels in accordance with said attribute information coincidence score.

13. The method for registering/verifying biometric information according to claim 11, wherein said step (i) of computing comprises:

comparing the plurality of types of verification-purpose attribute information with the plurality of types of registration-purpose attribute information associated with the respective registration-purpose feature information items, to thus determine whether or not a coincidence exists between said information items; and determining the verification priority levels in accordance with a priority level previously assigned to said information, which is determined to coincide with the verification-attribute information, among the plurality of types of registration-purpose attribute information.

14. The method for registering/verifying biometric information according to claim 11, wherein said step (j) of verifying comprises:

completing verification of the verification-purpose feature information against the respective registration-purpose feature information items at a point in time when a registration-purpose feature information item, which coincides with the verification-purpose feature information while a satisfying predetermined standard, appears; and specifying the registration-purpose feature information items satisfying the predetermined standards as information coinciding with said verification-purpose feature information.

15. The method for registering/verifying biometric information according to claim 11, wherein said step (j) of verifying comprises:

grouping, as a verification object group, registration-purpose feature information items whose verification priority levels computed in said step (i) of computing are higher than a reference level;

verifying the verification-purpose feature information against all of registration-purpose feature information items belonging to the verification object group; and specifying, in accordance with a result of said verification, a registration-purpose feature information item having the highest coincidence as information coinciding with the verification-purpose feature information.

16. The method for registering/verifying biometric information according to claim 11, further comprising changing or updating the registration-purpose attribute information in the registration-purpose data storage section to the verification-purpose feature information extracted in said step (h) of extracting when information coinciding with the verification-purpose feature information has been specified from among the plurality of registration-purpose feature information items in said step (j) of verifying.

17. The method for registering/verifying biometric information according to claim 11, further comprising managing the number of said registration-purpose feature information items and changing, in accordance with the number, the number of types of the registration-purpose attribute information/said verification-purpose attribute information used when verification priority levels are computed in said step (i) of computing.

* * * * *

UNITED STATES PATENT AND TRADEMARK OFFICE
CERTIFICATE OF CORRECTION

PATENT NO. : 7,634,118 B2  Page 1 of 1
APPLICATION NO. : 12/453694
DATED : December 15, 2009
INVENTOR(S) : Takahiro Matsuda et al.

It is certified that error appears in the above-identified patent and that said Letters Patent is hereby corrected as shown below:

Column 25, Line 9, change "finger print" to --fingerprint--.

Signed and Sealed this

Twenty-third Day of February, 2010

David J. Kappos
*Director of the United States Patent and Trademark Office*